United States Patent
Homma et al.

(10) Patent No.: US 11,891,115 B2
(45) Date of Patent: Feb. 6, 2024

(54) STEERING DEVICE

(71) Applicant: YAMADA MANUFACTURING CO., LTD., Kiryu (JP)

(72) Inventors: Taisuke Homma, Kiryu (JP); Toru Sekiguchi, Kiryu (JP); Hiromitsu Baba, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/801,930

(22) PCT Filed: Mar. 19, 2021

(86) PCT No.: PCT/JP2021/011444
§ 371 (c)(1),
(2) Date: Aug. 24, 2022

(87) PCT Pub. No.: WO2021/193449
PCT Pub. Date: Sep. 30, 2021

(65) Prior Publication Data
US 2023/0136638 A1 May 4, 2023

(30) Foreign Application Priority Data

Mar. 27, 2020 (JP) ................ 2020-058293
Mar. 27, 2020 (JP) ................ 2020-058294

(51) Int. Cl.
*B62D 1/19* (2006.01)
*B62D 1/181* (2006.01)
*B62D 1/185* (2006.01)

(52) U.S. Cl.
CPC ............. *B62D 1/192* (2013.01); *B62D 1/181* (2013.01); *B62D 1/185* (2013.01)

(58) Field of Classification Search
CPC ......... B62D 1/192; B62D 1/181; B62D 1/185
See application file for complete search history.

(56) References Cited

U.S. PATENT DOCUMENTS 9,821,833 B2* 11/2017 Yamamoto ............ B62D 1/192
10,953,910 B2* 3/2021 Sekiguchi ............ B62D 1/192
(Continued)

FOREIGN PATENT DOCUMENTS

CN 103052556 A 4/2013
JP 2006-347243 12/2006
(Continued)

OTHER PUBLICATIONS

Chinese Office Action dated May 24, 2023 issued in corresponding Chinese application No. 2021800179823; Partial English translation included (12 pages).

(Continued)

*Primary Examiner* — Faye M Fleming
(74) *Attorney, Agent, or Firm* — Rankin, Hill & Clark LLP

(57) ABSTRACT

A steering device includes a pipe, a housing, a telescopic mechanism, and a load absorbing mechanism. The load absorbing mechanism includes an extending portion coupled to the telescopic mechanism and extending in a front-rear direction, a first sliding portion provided on a first side in a left-right direction with respect to the extending portion, and a second sliding portion provided on a second side in the left-right direction with respect to the extending portion.

14 Claims, 15 Drawing Sheets

(56) References Cited

U.S. PATENT DOCUMENTS

| | | | |
|---|---|---|---|
| 10,953,911 B2* | 3/2021 | Sekiguchi | B62D 1/185 |
| 11,345,390 B2* | 5/2022 | Tokizaki | B62D 1/181 |
| 11,518,427 B2* | 12/2022 | Homma | B62D 1/185 |
| 2003/0227163 A1 | 12/2003 | Murakami et al. | |
| 2019/0185045 A1 | 6/2019 | Takahashi et al. | |
| 2019/0283793 A1 | 9/2019 | Matsuno et al. | |
| 2020/0039567 A1 | 2/2020 | Sekiguchi et al. | |
| 2020/0207403 A1 | 7/2020 | Kirmsze | |
| 2022/0048556 A1* | 2/2022 | Kim | B62D 1/181 |
| 2023/0081714 A1* | 3/2023 | Homma | B62D 1/181 |

FOREIGN PATENT DOCUMENTS

| | | | | |
|---|---|---|---|---|
| JP | 2019-107993 | | 7/2019 | |
| JP | 2019-156334 | | 9/2019 | |
| JP | 2020-19327 | | 2/2020 | |
| WO | WO-2015064345 A1 * | 5/2015 | | B62D 1/184 |
| WO | 2019/030285 | | 2/2019 | |

OTHER PUBLICATIONS

International Search Report, International Application No. PCT/JP2021/011444, dated May 11, 2021, 2 pages.

* cited by examiner

STEERING DEVICE

TECHNICAL FIELD

The present disclosure relates to a steering device.

Priority is claimed on Japanese Patent Application No. 2020-058293, filed Mar. 27, 2020 and Japanese Patent Application No. 2020-058294, filed Mar. 27, 2020, the contents of which are incorporated herein by reference.

BACKGROUND ART

A certain steering device is provided with a telescopic function of adjusting front and rear positions of a steering wheel in accordance with a body difference or a driving posture of a driver. This type of the steering device includes an outer column supported by a vehicle body, an inner column held inside the outer column to be movable in a front-rear direction, and a telescopic mechanism that connects the outer column and the inner column to be movable forward and rearward. The inner column supports a steering shaft to be rotatable. A steering wheel is attached to a rear end portion of the steering shaft.

The steering device is equipped with a configuration that cushions an impact load applied to the driver in a process in which the inner column moves forward with respect to the outer column (collapse stroke), when a predetermined load acts on the steering wheel at the time of a secondary collision. For example, Patent Document 1 below discloses a configuration in which a guide projection formed in the telescopic mechanism is held in a guide groove formed in the outer column.

In the steering device according to Patent Document 1, the inner column is moved forward and rearward with respect to the outer column by a driving force of the telescopic mechanism during a telescopic operation.

On the other hand, when the predetermined load acts on the steering wheel at the secondary collision, the telescopic mechanism is separated from the outer column. Thereafter, the inner column and the telescopic mechanism try to move forward with respect to the outer column. In this case, the inner column moves forward while the guide projection spreads the guide groove. As a result, the steering device according to Patent Document 1 cushions the impact load applied to the driver at the secondary collision.

CITATION LIST

Patent Document

[Patent Document 1]
Japanese Unexamined Patent Application, First Publication No. 2006-347243

SUMMARY OF INVENTION

Technical Problem

Incidentally, in order to efficiently cushion the impact load, it is conceivable that plastically deforming the guide groove is preferable.

However, in the above-described related art, when the guide groove is spread by the guide projection, a partition wall itself (outer column) forming the guide groove moves or deforms. Consequently, it is difficult to secure desired impact absorbing performance.

In the above-described related art, there is still room for improvement in terms of achieving stable impact absorbing performance at the secondary collision. Specifically, in the above-described related art, the guide projection is formed in a rectangular shape in a plan view. Therefore, the guide projection slides on an inner surface of the guide groove in a state where a corner portion is in contact with the inner surface of the guide groove. In this case, the corner portion of the guide projection is caught on the inner surface of the guide groove, and a load acting between the guide projection and the inner surface of the guide groove is likely to fluctuate.

The present disclosure provides a steering device which easily secures desired impact absorbing performance.

Solution to Problem

In order to solve the above-described problem, the present disclosure adopts the following aspects.

(1) According to an aspect of the present disclosure a steering device is provided including a pipe into which a steering shaft is inserted to be rotatable around an axis along a front-rear direction, a housing supported by a vehicle body and configured to support the pipe to be movable in the front-rear direction, a telescopic mechanism configured to move the pipe with respect to the housing in the front-rear direction, and a load absorbing mechanism configured to connect the pipe and the telescopic mechanism to each other. The telescopic mechanism includes an actuator coupled to the housing, and a feed mechanism having an engaging portion coupled to the actuator and an engaged portion coupled to the load absorbing mechanism and engaged with the engaging portion in the front-rear direction and configured to transmit a driving force of the actuator to the pipe via the engaging portion and the engaged portion. The load absorbing mechanism includes an extending portion coupled to any one member of the pipe and the feed mechanism and extending in the front-rear direction, a sliding portion provided on a first side in a left-right direction with respect to the extending portion in the other member of the pipe and the feed mechanism and configured to plastically deform the extending portion by moving relative to the one member while sliding on a side surface of the extending portion which faces the first side in the left-right direction, when a load acting on the pipe is a predetermined value or greater, and a restriction portion provided on a second side in the left-right direction with respect to the extending portion in the other member and configured to be movable in concert with the sliding portion, when the load acting on the pipe is the predetermined value or greater and to restrict movement or deformation of the extending portion to the second side in the left-right direction.

According to this aspect, when the load having the predetermined value or greater is applied to the pipe, at the time of a secondary collision, the pipe moves forward with respect to the housing. In this case, in a process in which the sliding portion slides on the side surface of the extending portion, the extending portion plastically deforms so that an impact load can be absorbed.

In particular, in this aspect, when the extending portion tries to move or deform to a side separated from the sliding portion due to a load acting between the sliding portion and the extending portion when the sliding portion slides, movement or deformation of the extending portion can be restricted by the restriction portion. In this manner, the extending portion can efficiently and plastically deform, and desired impact absorbing performance can be secured.

Moreover, in this aspect, the engaging portion and the engaged portion of the feed mechanism engage with each other in the front-rear direction. Therefore, at the secondary collision, forward movement of the feed mechanism with respect to the actuator is restricted. In this manner, at the secondary collision, it is possible to prevent the load absorbing mechanism from moving forward together with the feed mechanism. Therefore, a load can be effectively generated between the extending portion and the sliding portion. As a result, desired impact absorbing performance can be secured.

The actuator of the telescopic mechanism is fixed to the housing. Therefore, the actuator does not move during a telescopic operation or at the secondary collision. Therefore, a movement space of the actuator does not need to be secured around the steering device, and layout design can be improved.

(2) In the steering device according to the aspect (1), it is preferable that the restriction portion plastically deforms the extending portion by moving in concert with the sliding portion while sliding on the side surface of the extending portion which faces the second side in the left-right direction.

According to this aspect, as the sliding portion and the restriction portion move forward with respect to the extending portion, the extending portion plastically deforms and is squeezed by the sliding portion and the restriction portion. In this manner, it is possible to improve impact absorbing performance while the movement or the deformation of the extending portion in the left-right direction is restricted.

(3) In the steering device according to the aspect (1) or (2), it is preferable that the sliding portion and the restriction portion are formed line-symmetrically with respect to a symmetric line which extends along the front-rear direction through a center of the extending portion.

According to this aspect, a load acting among the sliding portion, the restriction portion, and the extending portion is likely to be uniform.

(4) In the steering device according to any one of the aspects (1) to (3), it is preferable that the one member is provided with a first guide located on a side opposite to the extending portion in the left-right direction with respect to the sliding portion, and configured to guide movement of the sliding portion in the front-rear direction, and a second guide located on a side opposite to the extending portion in the left-right direction with respect to the restriction portion, and configured to guide movement of the restriction portion in the front-rear direction.

According to this aspect, at the secondary collision, the sliding portion and the restriction portion can be smoothly moved in the front-rear direction along the extending portion. When the sliding portion and the restriction portion try to move or deform outward in the left-right direction due to the load acting among the extending portion, the sliding portion, and the restriction portion, the movement or the deformation of the sliding portion and the restriction portion can be restricted by the guide.

(5) In the steering device according to any one of the aspects (1) to (4), it is preferable that the extending portion is connected to the feed mechanism on the first side in the left-right direction, and is supported by the housing on the second side in the left-right direction.

According to this aspect, the extending portion is supported on both left and right sides. Therefore, the movement of the extending portion with respect to the housing in the left-right direction can be restricted. In this manner, at the secondary collision, it is possible to prevent the extending portion itself from being displaced in the left-right direction due to the load generated among the sliding portion, the restriction portion, and the extending portion.

(6) In the steering device according to any one of the aspects (1) to (5), it is preferable that the feed mechanism includes a shaft coupled to an output shaft of the actuator and having a male screw as the engaging portion, and a nut connected to the one member and having a female screw portion that engages with the male screw as the engaged portion.

According to this aspect, a feed screw mechanism is adopted as the feed mechanism. Therefore, it is easy to secure an engagement force between the male screw of the shaft and the female screw of the nut, and it is easy to adjust a stroke of the pipe with respect to a rotation amount of the actuator during the telescopic operation. In addition, an impact absorbing mechanism is coupled to the feed screw mechanism serving as the feed mechanism. Therefore, the nut is locked to the shaft at the secondary collision, and the forward movement of the feed mechanism (nut) is restricted. In this manner, at the secondary collision, it is possible to prevent the load absorbing mechanism from moving forward together with the feed mechanism. Therefore, a load can be effectively generated between the extending portion and the sliding portion. As a result, desired impact absorbing performance can be secured.

(7) In the steering device according to any one of the aspects (1) to (6), it is preferable that the load absorbing mechanism includes a restriction member configured to restrict movement of the extending portion in an up-down direction with respect to the sliding portion.

According to this aspect, the movement of the extending portion in the up-down direction with respect to the sliding portion is restricted. As a result, the sliding portion can be prevented from being separated from the extending portion, and absorbed energy absorbed by the load absorbing mechanism can be stabilized over an entire region of a collapse stroke.

(8) According to another aspect of the present disclosure, there is provided a steering device including a pipe into which a steering shaft is inserted to be rotatable around an axis along a front-rear direction, a housing supported by a vehicle body and configured to support the pipe to be movable in the front-rear direction, a telescopic mechanism configured to move the pipe with respect to the housing in the front-rear direction, and a load absorbing mechanism configured to connect the pipe and the telescopic mechanism to each other. The telescopic mechanism includes an actuator coupled to the housing, and a feed mechanism having an engaging portion coupled to the actuator and an engaged portion coupled to the load absorbing mechanism and engaged with the engaging portion in the front-rear direction and configured to transmit a driving force of the actuator to the pipe via the engaging portion and the engaged portion. The load absorbing mechanism includes an extending portion coupled to any one member of the pipe and the feed mechanism and extending in the front-rear direction, a first sliding portion provided on a first side in a left-right direction with respect to the extending portion in the other member of the pipe and the feed mechanism, and configured to move relative to the one member while sliding on a side surface of the extending portion which faces the first side in the left-right direction, when a forward load acting on the pipe is a predetermined value or greater, and a second sliding portion provided on a second side in the left-right direction with respect to the extending portion in the other member and configured to move in concert with the first sliding portion while sliding on a side surface of the extending portion which faces the second side in the left-right direction, when the load acting on the pipe is the predetermined value or greater. Each of a first contact portion of the first sliding portion which comes into contact with the extending portion and a second contact portion of the second sliding portion which comes into contact with the extending portion forms a curved surface projecting toward the extending portion.

According to this aspect, when the load having the predetermined value or greater is applied to the pipe, at the time of a secondary collision, the pipe moves forward with respect to the housing. In this case, in a process in which the sliding portion slides on the side surface of the extending portion, the extending portion or the sliding portion plastically deforms so that the impact load can be absorbed.

In particular, in this aspect, each contact portion has the curved surface. Therefore, when the sliding portion slides on the extending portion during the collapse stroke generated due to the secondary collision, the pressing portion and the extending portion can be prevented from being caught on each other. In this manner, the sliding portion can be smoothly moved on the extending portion. Accordingly, the impact load can be efficiently cushioned over the entire collapse stroke. Therefore, the impact absorbing performance can be improved.

In this aspect, the engaging portion and the engaged portion of the telescopic mechanism engage with each other in the front-rear direction. Therefore, at the secondary collision, the forward movement of the feed mechanism with respect to the actuator is restricted. In this manner, at the secondary collision, it is possible to prevent the load absorbing mechanism from moving forward together with the feed mechanism. Therefore, a load can be effectively generated between the extending portion and the sliding portion. As a result, desired impact absorbing performance can be secured.

The actuator of the telescopic mechanism is fixed to the housing. Therefore, the actuator does not move during a telescopic operation and at the secondary collision. Therefore, a movement space of the actuator does not need to be secured around the steering device, and layout designing can be improved.

(9) In the steering device according to the aspect (8), it is preferable that the extending portion includes a narrow portion that is narrower than a distance between the first contact portion and the second contact portion in the left-right direction, and a wide portion that is wider than a distance between the first contact portion and the second contact portion in the left-right direction, and configured to be plastically deformable when the first sliding portion and the second sliding portion slide.

According to this aspect, an outward bulging portion of the wide portion in the left-right direction with respect to the narrow portion functions as a deformable portion which is plastically deformable by the sliding portion (contact portion) during the collapse stroke generated due to the secondary collision. In this aspect, as described above, the contact portion and the extending portion can be prevented from being caught on each other as described above. Therefore, it is easy to secure a tightening allowance (overlapping range in a front view) between the sliding portion and the deformable portion.

(10) In the steering device according to the aspect (8) or (9), it is preferable that an outer peripheral surface of the first sliding portion extends to a side separated from the extending portion as the outer peripheral surface is directed toward both sides in the front-rear direction with respect to the first contact portion, and an outer peripheral surface of the second sliding portion extends to a side separated from the extending portion as the outer peripheral surface is directed toward both sides in the front-rear direction with respect to the second contact portion.

According to this aspect, it is possible to prevent a portion of the sliding portion other than the contact portion from coming into contact with the extending portion during the collapse stroke. In this manner, a contact position of the sliding portion in contact with the extending portion can be stabilized, and it is easy to secure desired impact absorbing performance.

(11) In the steering device according to any one of the aspects (8) to (10), it is preferable that the one member is provided with a first guide located on a side opposite to the extending portion in the left-right direction with respect to the first sliding portion, and configured to guide movement of the first sliding portion in the front-rear direction, and a second guide located on a side opposite to the extending portion in the left-right direction with respect to the second sliding portion, and configured to guide movement of the second sliding portion in the front-rear direction.

According to this aspect, the respective sliding portions can be smoothly moved in the front-rear direction along the extending portion during the collapse stroke generated due to the secondary collision. When the respective sliding portions tries to move or deform outward in the left-right direction due to the load acting between the extending portion and the respective sliding portions, elastic deformation of the respective sliding portions can be restricted by the guide.

(12) In the steering device according to the aspect (11), it is preferable that a facing surface facing the first guide in the first sliding portion is formed into a flat surface along the front-rear direction, and a facing surface facing the second guide in the second sliding portion is formed into a flat surface along the front-rear direction.

According to this aspect, the sliding portion is smoothly guided along the facing surface of the guide which faces the sliding portion during the collapse stroke generated due to the secondary collision.

(13) In the steering device according to any one of the aspects (8) to (12), it is preferable that the feed mechanism includes a shaft coupled to an output shaft of the actuator and having a male screw as the engaging portion, and a nut connected to the one member and having a female screw portion that engages with the male screw as the engaged portion.

According to this aspect, a feed screw mechanism is adopted as the feed mechanism. Therefore, it is easy to secure an engagement force between the male screw of the shaft and the female screw of the nut, and it is easy to adjust a stroke of the pipe with respect to a rotation amount of the actuator during the telescopic operation. The impact absorbing mechanism is coupled to the feed screw mechanism serving as the feed mechanism. Therefore, the nut is locked to the shaft at the secondary collision, and the forward movement of the feed mechanism (nut) is restricted. In this manner, at the secondary collision, it is possible to prevent the load absorbing mechanism from moving forward together with the feed mechanism. Therefore, a load can be effectively generated between the extending portion and the sliding portion. As a result, desired impact absorbing performance can be secured.

(14) In the steering device according to any one of the aspects (8) to (13), it is preferable that the load absorbing mechanism includes a restriction member that restricts movement of the extending portion in an up-down direction with respect to the first sliding portion and the second sliding portion.

According to this aspect, the movement of the extending portion in the up-down direction with respect to the sliding portion is restricted. As a result, the sliding portion can be prevented from being separated from the extending portion, and absorbed energy absorbed by the load absorbing mechanism can be stabilized over an entire region of a collapse stroke.

Advantageous Effects of Invention

According to the above-described respective aspects, desired impact absorbing performance can be secured.

DESCRIPTION OF EMBODIMENTS

Figure 1:
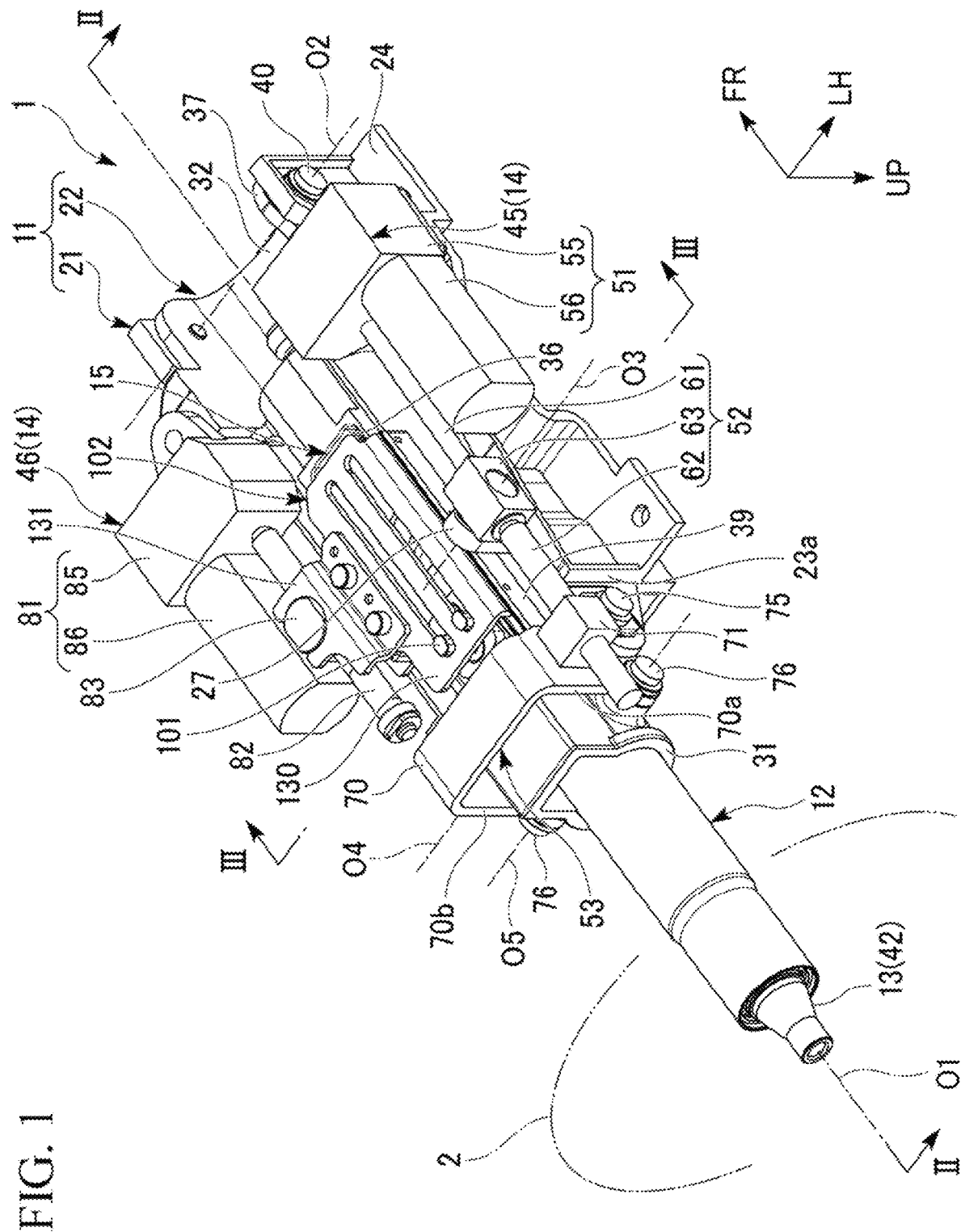
FIG. 1 is a perspective view of a steering device.

Hereinafter, an embodiment according to the present disclosure will be described with reference to the drawings. In the embodiments or modification examples described below, the same reference numerals will be assigned to corresponding configurations, and description thereof may be omitted in some cases. In the following description, for example, expressions indicating relative or absolute dispositions such as "parallel", "perpendicular", "center", and "coaxial" not only strictly represent the disposition, but also represent a state of relative displacement with an angle or a distance to such an extent that tolerances or the same functions can be obtained.

[Steering Device 1]

FIG. 1 is a perspective view of a steering device 1.

As represented in FIG. 1, the steering device 1 is mounted on a vehicle. The steering device 1 adjusts a steering angle of vehicle wheels in accordance with a rotational operation of a steering wheel 2.

The steering device 1 includes a housing 11, a pipe 12, a steering shaft 13, a drive mechanism 14, and a load absorbing mechanism 15. The pipe 12 and the steering shaft 13 each are formed along an axis O1. Therefore, in the following description, an extending direction of the axis O1 of the pipe 12 and the steering shaft 13 will be simply referred to as a shaft axial direction, a direction perpendicular to the axis O1 will be simply referred to as a shaft radial direction, and a direction around the axis O1 will be simply referred to as a shaft circumferential direction, in some cases.

The steering device 1 according to the present embodiment is mounted on a vehicle in a state where the axis O1 intersects with a front-rear direction. Specifically, the axis O1 of the steering device 1 extends upward as the steering device 1 is directed rearward. However, in the following description, for the sake of convenience, in the steering device 1, a direction toward the steering wheel 2 in the shaft axial direction will be simply referred to as rearward, and a direction toward a side opposite to the steering wheel 2 will be simply referred to as forward (arrow FR). In the shaft radial direction, an up-down direction in a state where the steering device 1 is attached to the vehicle will be simply referred to as an up-down direction (arrow UP represents upward), and a left-right direction in the same state will be simply referred to as a left-right direction (arrow LH represents a left side).

<Housing 11>

Figure 2:
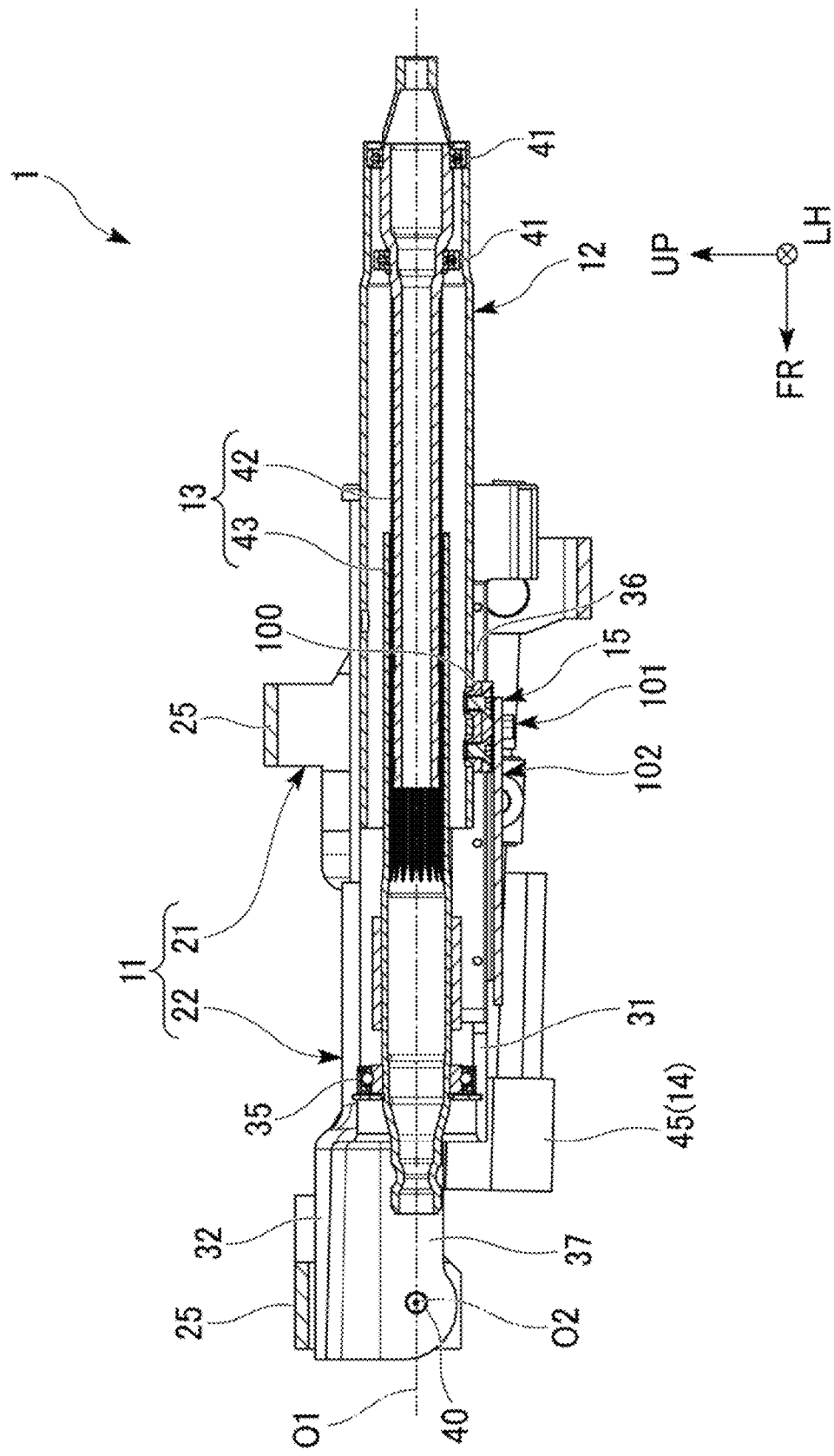
FIG. 2 is a sectional view taken along line II-II in FIG. 1.
Figure 3:
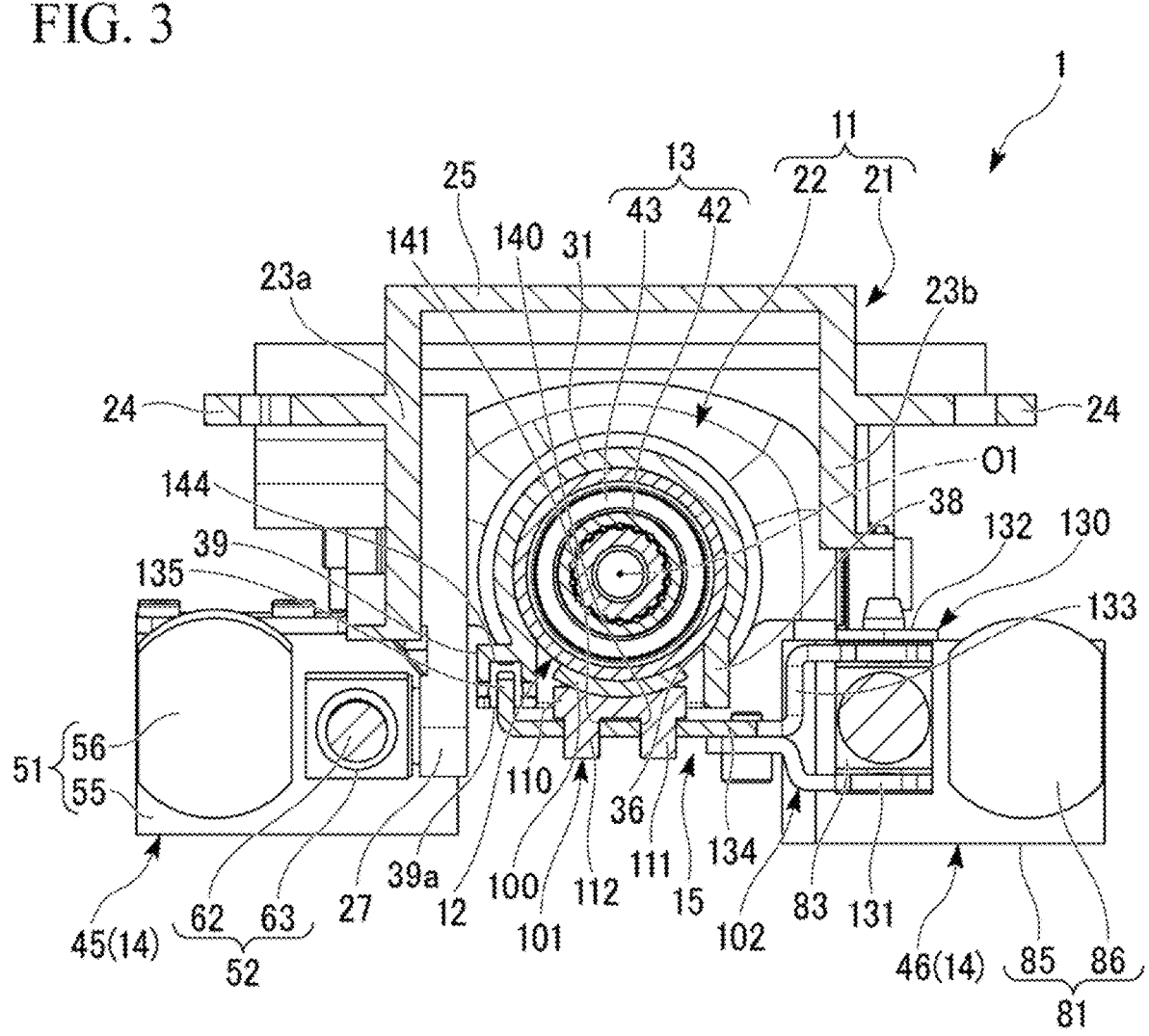
FIG. 3 is a sectional view taken along line III-III in FIG. 1.

FIG. 2 is a sectional view taken along line II-II in FIG. 1.
FIG. 3 is a sectional view taken along line III-III in FIG. 1.

As represented in FIGS. 1 to 3, the housing 11 includes a tilt bracket 21 and a housing body 22.

The tilt bracket 21 includes a pair of left and right side frames 23a and 23b, attachment stays 24 formed in the respective side frames 23a and 23b, and a bridge 25 for bridging the respective side frames 23a and 23b.

The side frames 23a and 23b extend in the front-rear direction while the left-right direction is used as a thickness direction. Out of lower end edges of the side frames 23a and 23b, a protruding piece 27 is formed in a front end portion of the side frame 23a on one side (left side). The protruding piece 27 protrudes downward from the front end portion of one side frame 23a.

Each of the attachment stays 24 projects outward in the left-right direction from upper end portions of the side frames 23a and 23b. The housing 11 is supported by a vehicle body via the attachment stay 24.

The bridge 25 integrally bridges the upper end portions of the respective side frames 23. Each of the bridges 25 is provided in both front and rear end portions in the side frames 23.

The housing body 22 is disposed inside the tilt bracket 21. The housing body 22 has a holding cylinder 31 and a front extending portion 32.

The holding cylinder 31 is formed in a cylindrical shape extending in the shaft axial direction (front-rear direction). As represented in FIG. 2, an outer ring of a front bearing 35 is fitted (press-fitted) to a front end portion inside the holding cylinder 31. As represented in FIGS. 1 to 3, a slit 36 is formed in an intermediate portion of the holding cylinder 31 in the front-rear direction. The slit 36 extends in the front-rear direction.

As represented in FIG. 3, in the holding cylinder 31, protruding walls (first protruding wall 38 and second protruding wall 39) are formed in opening edges of the slit 36. The first protruding wall 38 protrudes downward from a right opening edge in the opening edges of the slit 36. The first protruding wall 38 extends in the front-rear direction along the right opening edge of the slit 36.

The second protruding wall 39 protrudes downward from a left opening edge in the opening edges of the slit 36. The second protruding wall 39 extends in the front-rear direction along the left opening edge of the slit 36. The second protruding wall 39 has a recess portion 39a which is open downward.

As represented in FIG. 1, the front extending portion 32 protrudes forward from the holding cylinder 31. The front extending portion 32 is formed in a U-shape which is open downward in a sectional view perpendicular to the front-rear direction. In the represented example, a distance between the pair of side walls 37 facing each other in the left-right direction in the front extending portion 32 is longer than an outer diameter of the holding cylinder 31. The side walls 37 each are coupled to the side frames 23a and 23b facing each other in the tilt bracket 21 via a pivot shaft 40. In this manner, the housing body 22 is supported by the tilt bracket 21 to be pivotable around the pivot shaft 40 (around an axis O2 extending in the left-right direction).

<Pipe 12>

The pipe 12 is formed in a cylindrical shape extending in the shaft axial direction. The pipe 12 is inserted into the holding cylinder 31. The pipe 12 is configured to be movable in the shaft axial direction with respect to the holding cylinder 31. As represented in FIG. 2, an outer ring of a rear bearing 41 is fitted (press-fitted) to a rear end portion of the pipe 12.

<Steering Shaft 13>

The steering shaft 13 includes an inner shaft 42 and an outer shaft 43.

The inner shaft 42 is formed in a cylindrical shape extending in the shaft axial direction. The inner shaft 42 is inserted into the pipe 12. A rear end portion of the inner shaft 42 is press-fitted to an inner ring of the rear bearing 41. In this manner, the inner shaft 42 is supported to be rotatable around the axis O1 via the rear bearing 41. The steering wheel 2 is coupled to a portion protruding rearward from the pipe 12 in the inner shaft 42. The inner shaft 42 may be solid.

The outer shaft 43 is formed in a cylindrical shape extending in the shaft axial direction. The outer shaft 43 is inserted into the pipe 12. The inner shaft 42 is inserted into a rear end portion of the outer shaft 43 inside the pipe 12. A front end portion of the outer shaft 43 is press-fitted to an inner ring of the front bearing 35 inside the holding cylinder 31. In this manner, the outer shaft 43 is supported to be rotatable around the axis O1 inside the holding cylinder 31.

The inner shaft 42 and the pipe 12 are configured to be movable in the shaft axial direction with respect to the outer shaft 43. An outer peripheral surface of the inner shaft 42 has a male spline, for example. The male spline engages with a female spline formed on an inner peripheral surface of the outer shaft 43. In this manner, while relative rotation with respect to the outer shaft 43 is restricted, the inner shaft 42 moves in the shaft axial direction with respect to the outer shaft 43. However, a telescopic structure or a rotation restriction structure of the steering shaft 13 can be appropriately changed. In the present embodiment, a configuration has been described in which the outer shaft 43 is disposed forward of the inner shaft 42. However, the present embodiment is not limited only to this configuration. A configuration may be adopted so that the outer shaft 43 is disposed behind the inner shaft 42.

<Drive Mechanism 14>

As represented in FIG. 1, the drive mechanism 14 includes a tilt mechanism 45 and a telescopic mechanism 46. For example, the tilt mechanism 45 is disposed on the left side of the housing 11. For example, the telescopic mechanism 46 is disposed on the right side of the housing 11. The drive mechanism 14 may have at least the telescopic mechanism 46.

The tilt mechanism 45 forms a so-called feed screw mechanism. Specifically, the tilt mechanism 45 includes a tilt motor unit 51, a tilt coupling portion 52, and a tilt movable portion 53. The tilt mechanism 45 switches between restriction and allowance of the steering device 1 pivoting around the axis O2 by driving the tilt motor unit 51.

The tilt motor unit 51 includes a tilt gear box 55 and a tilt motor 56.

The tilt gear box 55 is attached to a front end portion of the side frame 23a in a state of projecting outward from the side frame 23a in the left-right direction.

The tilt motor 56 is attached to the tilt gear box 55 from behind in a state where an output shaft (not represented) is directed forward. An output shaft of the tilt motor 56 is connected to a speed reduction mechanism (not represented) inside the tilt gear box 55.

The tilt coupling portion 52 includes a tilt wire 61, a tilt shaft 62, and a tilt coupling 63 that couples the tilt wire 61 and the tilt shaft 62 to each other.

The tilt coupling 63 is supported by a protruding piece 27 to be rotatable around an axis O3 extending in the left-right direction.

The tilt wire 61 bridges the tilt gear box 55 and the tilt coupling 63. The tilt wire 61 is configured to be rotatable in accordance with driving of the tilt motor 56. The tilt wire 61 is configured to be flexibly deformable. A connection member connecting the tilt gear box 55 and the tilt coupling 63 to each other is not limited to those which are flexibly deformable like the tilt wire 61. That is, depending on a layout of the tilt gear box 55 and the tilt coupling 63, the tilt gear box 55 and the tilt coupling 63 may be connected to each other by a connection member which does not flexibly deform.

The tilt shaft 62 bridges the tilt coupling 63 and the tilt movable portion 53. The tilt shaft 62 is rotated together with the tilt wire 61 in accordance with the driving of the tilt motor 56. A male screw portion is formed on an outer peripheral surface of the tilt shaft 62.

The tilt movable portion 53 includes a link member 70 and a tilt nut 71.

The link member 70 is formed in a U-shape which is open upward. The link member 70 has side walls 70a and 70b facing each other in the left-right direction. The side wall 70a is disposed between the holding cylinder 31 and the side frame 23a. The side wall 70b is disposed between the holding cylinder 31 and the side frame 23b.

The side wall 70a and the side frame 23a are coupled to each other by a first bolt 75 extending in the left-right direction. The side wall 70b and the side frame 23b are coupled to each other by a first bolt (not represented). In this manner, the link member 70 is supported by the tilt bracket 21 to be pivotable around an axis O4 extending in the left-right direction.

The side wall 70*a* and the holding cylinder 31 are coupled to each other by a second bolt 76 extending in the left-right direction. The side wall 70*b* and the holding cylinder 31 are coupled to each other by the second bolt 76. The second bolt 76 is disposed behind the first bolt 75. In this manner, the link member 70 is supported by the holding cylinder 31 to be pivotable around an axis O5 extending parallel to the axis O4.

The tilt nut 71 is attached to a lower side of the side wall 70*a*. A female screw portion is formed on an inner peripheral surface of the tilt nut 71. The tilt shaft 62 meshes with the tilt nut 71. The tilt nut 71 is configured so that a position on the tilt shaft 62 can be changed in accordance with the rotation of the tilt shaft 62.

The telescopic mechanism 46 forms a so-called feed screw mechanism. Specifically, the telescopic mechanism 46 includes a telescopic motor unit (actuator) 81, a telescopic coupling portion 82, and a telescopic movable portion 83. The telescopic mechanism 46 switches between restriction and allowance of forward and rearward movements of the pipe 12 (steering shaft 13) with respect to the housing 11 by driving the telescopic motor unit 81.

The telescopic motor unit 81 includes a telescopic gear box 85 and a telescopic motor 86.

The telescopic gear box 85 is attached in a state of projecting outward from the front extending portion 32 in the left-right direction. Therefore, the telescopic motor unit 81 is configured to be pivotable around the axis O2 integrally with the housing body 22 by a driving force of the tilt mechanism 45.

The telescopic motor 86 is attached to the telescopic gear box 85 from behind in a state where an output shaft (not represented) is directed forward. An output shaft of the telescopic motor 86 is connected to a speed reduction mechanism inside the telescopic gear box 85. The telescopic motor unit 81 may be supported by the tilt bracket 21 via a wire.

Figure 4:
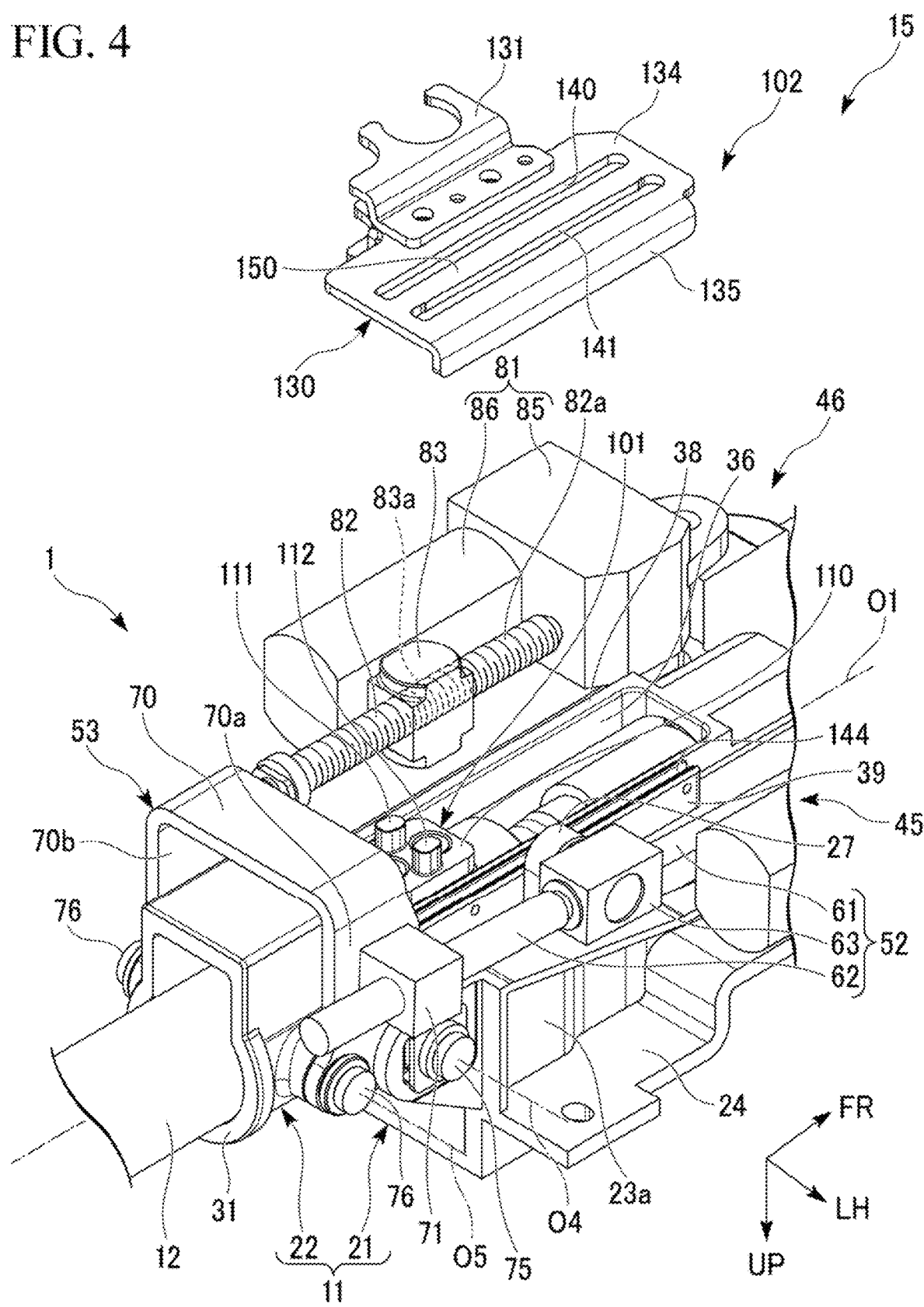
FIG. 4 is an exploded perspective view of a load absorbing mechanism.

FIG. 4 is an exploded perspective view of the load absorbing mechanism 15.

As represented in FIG. 4, the telescopic coupling portion 82 extends rearward from the telescopic gear box 85. The telescopic coupling portion 82 rotates around the axis in accordance with the driving of the telescopic motor 86. A male screw portion 82*a* is formed on an outer peripheral surface of the telescopic coupling portion 82.

The telescopic movable portion 83 is connected to the pipe 12 via the load absorbing mechanism 15. A female screw portion 83*a* is formed on an inner peripheral surface of the telescopic movable portion 83. The telescopic coupling portion 82 meshes with the telescopic movable portion 83. The telescopic movable portion 83 engages (is in contact) with the male screw portion 82*a* in the front-rear direction via the female screw portion 83*a*. The telescopic movable portion 83 is configured to be movable on the telescopic coupling portion 82 in accordance with the rotation of the telescopic coupling portion 82.

<Load Absorbing Mechanism 15>

As represented in FIGS. 3 and 4, the load absorbing mechanism 15 connects the telescopic movable portion 83 and the pipe 12 to each other. The load absorbing mechanism 15 transmits a driving force of the telescopic mechanism 46 to the pipe 12 during a telescopic operation when a load acting on the pipe 12 in the front-rear direction is smaller than a predetermined value and moves the pipe 12 together with the telescopic movable portion 83 in the front-rear direction with respect to the housing 11. When the load acting on the pipe 12 is equal to or greater than the predetermined value, at the secondary collision, the load absorbing mechanism 15 moves the pipe 12 in the front-rear direction with respect to the housing 11 independently of the telescopic mechanism 46. Specifically, the load absorbing mechanism 15 includes a hanger bracket 100, an energy absorbing (EA) block 101, and an EA plate 102.

The hanger bracket 100 is fixed to a lower portion of the pipe 12 in a front portion of the pipe 12. In the present embodiment, the hanger bracket 100 is fixed to the outer peripheral surface of the pipe 12 by means of welding. The hanger bracket 100 is disposed inside the slit 36.

The EA block 101 is provided below the hanger bracket 100. For example, the EA block 101 is integrally formed of a sintered material having an iron-based material. The EA block 101 includes a fixing plate 110, a first sliding portion 111, and a second sliding portion 112.

The fixing plate 110 overlaps the hanger bracket 100 from below. The fixing plate 110 is fixed to the hanger bracket 100 by means of screwing. The EA block 101 may be directly fixed to the pipe 12.

The first sliding portion 111 and the second sliding portion 112 face each other in the left-right direction. The first sliding portion 111 and the second sliding portion 112 protrude downward from the fixing plate 110. The respective sliding portions 111 and 112 protrude outward of the housing body 22 through the slit 36. In a plan view, the respective sliding portions 111 and 112 are formed line-symmetrically with respect to a symmetric line extending in the front-rear direction through a center of an extending portion 150 (to be described later). Therefore, in the following description, the first sliding portion 111 will be described as an example.

Figure 5:
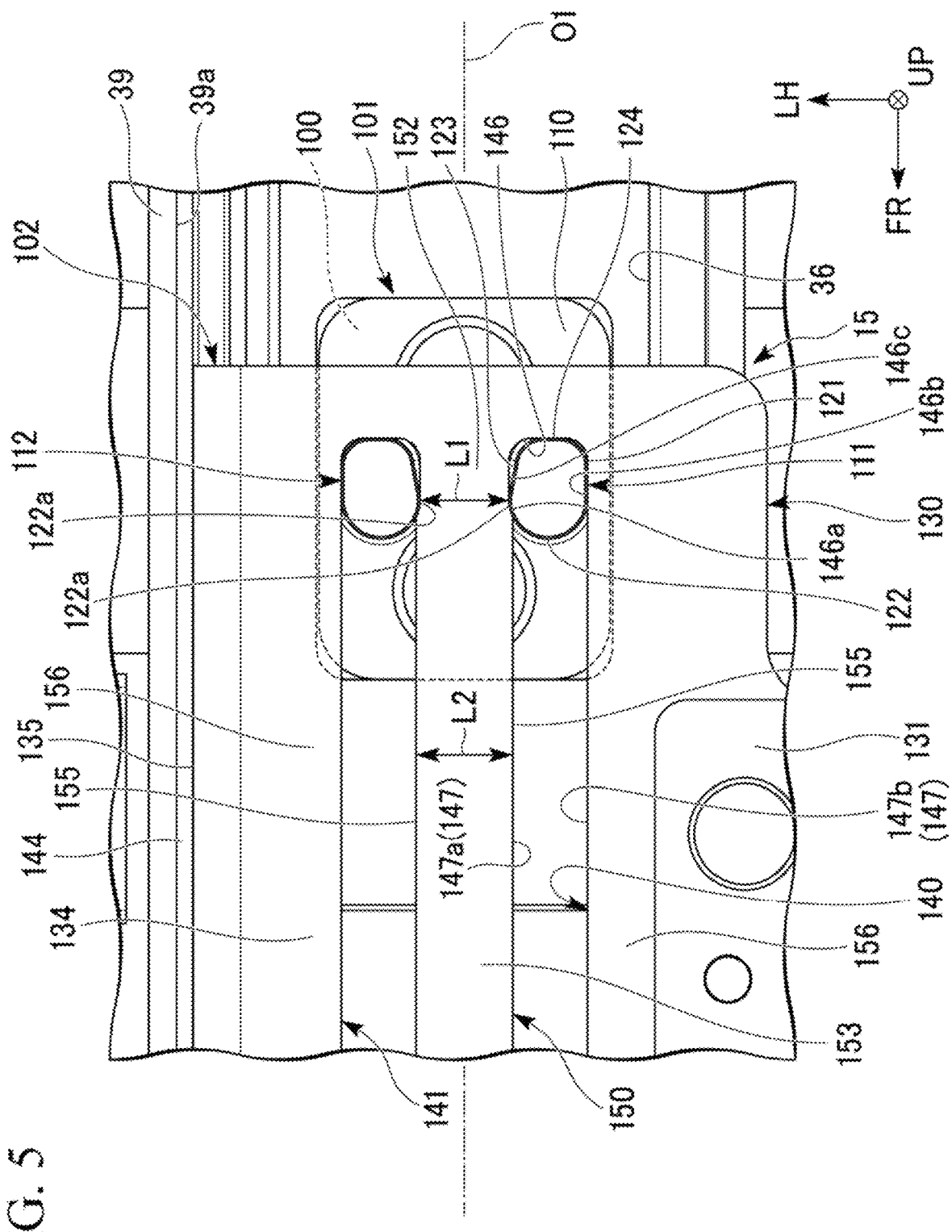
FIG. 5 is an enlarged view of the load absorbing mechanism.

FIG. 5 is an enlarged view of the load absorbing mechanism 15.

As represented in FIG. 5, the first sliding portion 111 is formed in an oval shape in a plan view while the front-rear direction is used as a longitudinal direction. An outer peripheral surface of the first sliding portion 111 has a guide surface 121, a contact surface 122, a flank 123, and a connection surface 124.

The guide surface 121 forms a portion of a surface facing outward in the left-right direction (outer surface) on the outer peripheral surface of the first sliding portion 111. The guide surface 121 is a flat surface extending along the front-rear direction. However, the guide surface 121 may be a curved surface.

The contact surface 122 is connected to a front end edge of the guide surface 121. The contact surface 122 forms a front end portion of a surface facing inward in the left-right direction (inner surface) from the front end portion of the outer surface via the front surface, on the outer peripheral surface of the first sliding portion 111. The contact surface 122 is formed on a curved surface projecting forward. In the represented example, the contact surface 122 is formed in a semicircular shape having a uniform radius of curvature and a central angle of approximately 180°. A portion located on the innermost side (hereinafter, referred to as a pressing portion 122*a*) of the contact surface 122 in the left-right direction is located on the innermost side of the outer peripheral surface of the first sliding portion 111 in the left-right direction. An interval between the respective sliding portions 111 and 112 in the left-right direction is minimized (distance L1) between the pressing portions 122*a*.

The flank 123 extends rearward from an inner end edge of the contact surface 122 in the left-right direction. The flank 123 forms a portion of the inner surface of the first sliding portion 111. The flank 123 is formed on an inclined surface extending outward in the left-right direction as the flank 123 is directed rearward. Therefore, the interval between the respective sliding portions 111 and 112 in the left-right direction gradually increases as the respective sliding portions 111 and 112 are directed rearward.

The connection surface 124 bridges rear end edges of the guide surface 121 and the flank 123. The connection surface 124 forms the rear end portion of the outer surface from the rear end portion of the inner surface via the rear surface, on the outer peripheral surface of the first sliding portion 111. A boundary portion on the connection surface 124 between the guide surface 121 and the flank 123 is rounded.

As represented in FIGS. 3 and 4, the EA plate 102 includes a main plate 130 and a sub plate 131.

The main plate 130 is formed in a crank shape in a front view when viewed in the front-rear direction. The main plate 130 is formed of a material (for example, SPHC) having rigidity lower than that of the EA block 101. The main plate 130 includes an attachment piece 132, a coupling piece 133, an operating piece 134, and a support piece 135.

The attachment piece 132 is formed in a plate shape while the up-down direction is set as the thickness direction. The attachment piece 132 is attached to the above-described telescopic movable portion 83 from above. The EA plate 102 is configured to be movable forward and rearward integrally with the telescopic movable portion 83.

The coupling piece 133 extends downward from an inner end edge of the attachment piece 132 in the left-right direction.

The operating piece 134 extends inward in the left-right direction from a lower end edge of the coupling piece 133. The operating piece 134 covers the pipe 12 from below. The rear end portion of the operating piece 134 overlaps the EA block 101 (sliding portions 111 and 112) in a plan view. A long hole (first long hole 140 and second long hole 141) is formed in the operating piece 134.

The support piece 135 extends upward from an end edge of the operating piece 134 which is located on a side opposite to the coupling piece 133. An upper end portion of the support piece 135 is accommodated inside the above-described recess portion 39a. A guide rail 144 is provided inside the recess portion 39a. The guide rail 144 is formed in a U-shape which is open downward and extends in the front-rear direction inside the recess portion 39a. The guide rail 144 is fitted into the recess portion 39a to cover the inner surface of the recess portion 39a. The guide rail 144 is formed of a material (for example, a resin material) in which frictional resistance generated with the support piece 135 is lower than frictional resistance acting between the support piece 135 and the inner surface of the recess portion 39a. The support piece 135 is accommodated inside the above-described guide rail 144. That is, the guide rail 144 guides the movement in the front-rear direction while restricting the movement of the main plate 130 (EA plate 102) in the left-right direction with respect to the housing body 22.

The sub plate 131 connects the telescopic movable portion 83 and the operating piece 134 to each other. Specifically, an outer end portion of the sub plate 131 in the left-right direction is attached to the telescopic movable portion 83 from below. That is, the sub plate 131 pinches the telescopic movable portion 83 with the above-described attachment piece 132 in the up-down direction. An inner end portion of the sub plate 131 in the left-right direction is connected to the operating piece 134.

Figure 6:
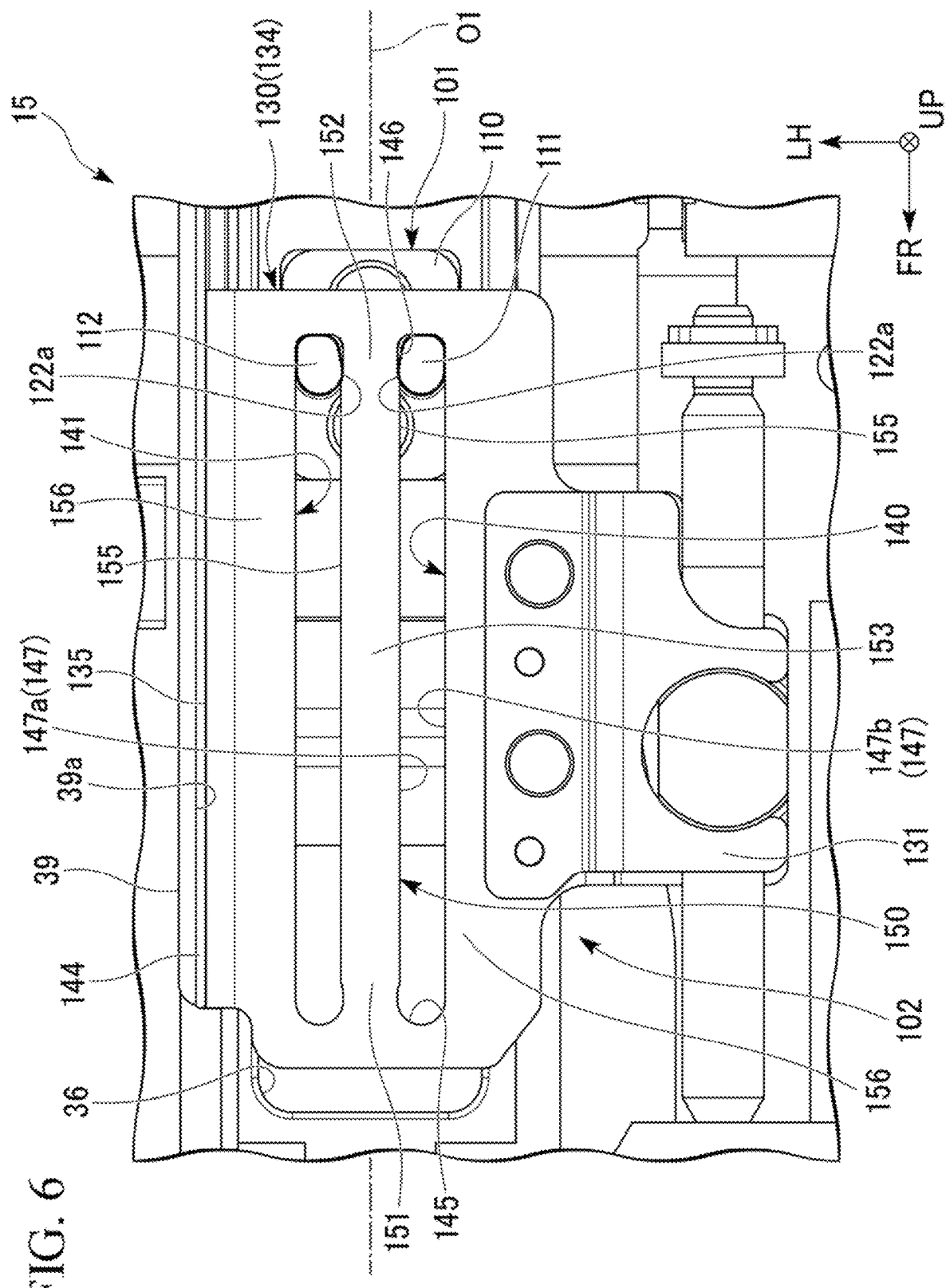
FIG. 6 is a view taken along an arrow VI in FIG. 3.

FIG. 6 is a view taken along an arrow VI in FIG. 3.

Here, as represented in FIGS. 5 and 6, each of the above-described long holes 140 and 141 penetrates the operating piece 134 in the up-down direction and extends in the front-rear direction. The respective long holes 140 and 141 are formed line-symmetrically with respect to a symmetric line extending in the front-rear direction through the center of the extending portion 150 (to be described later) in a plan view. Therefore, in the following description, the first long hole 140 will be described as an example.

The first long hole 140 includes enlarged portions (front enlarged portion 145 and rear enlarged portion 146) located in both end portions in the front-rear direction, and a transition portion 147 connecting the enlarged portions 145 and 146 to each other.

The transition portion 147 linearly extends in the front-rear direction. In the transition portion 147, an outward facing side surface 147a facing outward in the left-right direction and an inward facing side surface 147b facing inward in the left-right direction are formed into flat surfaces extending parallel to each other along the front-rear direction.

As represented in FIG. 6, the width (maximum width) of the front enlarged portion 145 in the left-right direction is wider than the width (maximum width) of the transition portion 147 in the left-right direction. The front enlarged portion 145 bulges inward in the left-right direction with respect to the outward facing side surface 147a of the transition portion 147. The inner peripheral surface of the front enlarged portion 145 is formed on a curved surface.

As represented in FIG. 5, the width (maximum width) of the rear enlarged portion 146 in the left-right direction is wider than the width (maximum width) of the transition portion 147 in the left-right direction. The rear enlarged portion 146 bulges inward in the left-right direction with respect to the outward facing side surface 147a of the transition portion 147. The front end portion of the rear enlarged portion 146 is connected to the outward facing side surface 147a of the transition portion 147 via an inclined surface 146a extending outward in the left-right direction as the front end portion is directed forward. The above-described first sliding portion 111 is fitted into the rear enlarged portion 146. The guide surface 121 of the first sliding portion 111 is close to or in contact with the inward facing side surface 146b of the rear enlarged portion 146. The pressing portion 122a of the first sliding portion 111 is close to or in contact with the outward facing side surface 146c of the rear enlarged portion 146.

As represented in FIGS. 4, 5, and 6, a portion of the operating piece 134 which is located between the respective long holes 140 and 141 forms the extending portion 150 extending in the front-rear direction. The extending portion 150 includes a front constriction portion 151, a rear constriction portion (narrow portion) 152, and a wide portion 153. The front constriction portion 151 is a portion located between the front enlarged portions 145. The rear constriction portion 152 is a portion located between the rear enlarged portions 146. The width of each of the constriction portions 151 and 152 in the left-right direction is set to be equal to or smaller than the distance L1 between the pressing portions 122a of the respective sliding portions 111 and 112.

A portion bulging outward in the left-right direction with respect to each of the constriction portions 151 and 152 in the wide portion 153 forms a deformable portion 155. In a front view, the deformable portion 155 overlaps at least the pressing portion 122a of the contact surfaces 122 of the respective sliding portions 111 and 112 in the front view. The deformable portion 155 is configured to be plastically deformable in such a manner that the respective sliding portions 111 and 112 (pressing portions 122a) slides when a predetermined load is input forward to the EA block 101 at the secondary collision. Therefore, the deformable portion 155 is not deformable when the load acting on the EA block 101 via the pipe 12 is smaller than a predetermined value (for example, during the telescopic operation). When the load acting on the pipe 12 is smaller than the predetermined value, the relative movement of the EA block 101 with respect to the EA plate 102 is restricted in a state where the respective sliding portions 111 and 112 are fitted into the respective rear enlarged portions 146.

A portion of the operating piece 134 which is located on a side opposite to the extending portion 150 (outside in the left-right direction) with respect to the respective long holes 140 and 141 forms a guide 156 extending in the front-rear direction. The guide 156 is located outside the respective sliding portions 111 and 112 in the left-right direction and restricts outward displacement of the respective sliding portions 111 and 112 in the left-right direction. The side surfaces (inward facing side surfaces 146b and 147b of the long holes 140 and 141) of the guide 156 which face inward in the left-right direction face the above-described guide surface 121. The guide 156 and the guide surface 121 may be in contact with each other.

[Operation]

Next, an operation of the above-described steering device 1 will be described. In the following description, a tilt operation, a telescopic operation, and a collapse stroke at the secondary collision will be mainly described.

<Tilt Operation>

As represented in FIG. 1, in the tilt operation, a driving force of the tilt motor 56 is transmitted to the housing body 22 via the link member 70 so that the housing body 22 pivots around the axis O2. Specifically, when the steering wheel 2 is adjusted upward, the tilt motor 56 is driven to rotate the tilt wire 61 and the tilt shaft 62 in a first direction (loosening direction of the tilt nut 71), for example. When the tilt shaft 62 rotates in the first direction, the tilt nut 71 moves rearward with respect to the tilt shaft 62. Since the tilt nut 71 moves rearward, the housing body 22 pivots upward around the axis O2 with respect to the tilt bracket 21. As a result, the steering wheel 2 pivots upward around the axis O2 together with the housing body 22, the pipe 12, and the steering shaft 13.

When the steering wheel 2 is adjusted downward, the tilt shaft 62 is rotated in a second direction (tightening direction of the tilt nut 71). Then, the tilt nut 71 moves forward with respect to the tilt shaft 62. Since the tilt nut 71 moves forward, the housing body 22 pivots downward around the axis O2 with respect to the tilt bracket 21. As a result, the steering wheel 2 pivots downward around the axis O2 together with the housing body 22, the pipe 12, and the steering shaft 13.

<Telescopic Operation>

During the telescopic operation, the driving force of the telescopic motor 86 is transmitted to the pipe 12 via the EA plate 102 and the EA block 101 so that the pipe 12 and the inner shaft 42 move forward and rearward with respect to the housing 11 and the outer shaft 43. When the steering wheel 2 is moved rearward, the telescopic motor 86 is driven to rotate the telescopic coupling portion 82 in the first direction (loosening direction of the telescopic movable portion 83), for example. When the telescopic coupling portion 82 rotates in the first direction, the telescopic movable portion 83 and the EA plate 102 move rearward with respect to the telescopic coupling portion 82. The driving force of the EA plate 102 is transmitted to the EA block 101. In this case, the relative movement of the EA block 101 with respect to the EA plate 102 is restricted in a state where the respective sliding portions 111 and 112 are fitted into the respective rear enlarged portions 146. Therefore, the driving force of the EA plate 102 is transmitted to the pipe 12 via the EA block 101. As a result, the pipe 12 moves rearward together with the inner shaft 42 so that the steering wheel 2 moves rearward.

When the steering wheel 2 is moved forward, the telescopic coupling portion 82 is rotated in the second direction, for example. When the telescopic coupling portion 82 rotates in the second direction (tightening direction of the telescopic movable portion 83), the telescopic movable portion 83 and the EA plate 102 move forward with respect to the telescopic coupling portion 82. As the EA plate 102 moves forward, the driving force of the EA plate 102 is transmitted to the pipe 12 via the EA block 101. In this manner, the pipe 12 moves forward so that the steering wheel 2 moves forward.

<At Time of Secondary Collision>

Next, an operation at the secondary collision will be described.

As represented in FIG. 6, at the secondary collision (when a collision load is equal to or greater than a predetermined value), the steering wheel 2 moves forward with respect to the housing body 22 and the outer shaft 43 together with the pipe 12, the EA block 101, and the inner shaft 42.

Figure 7:
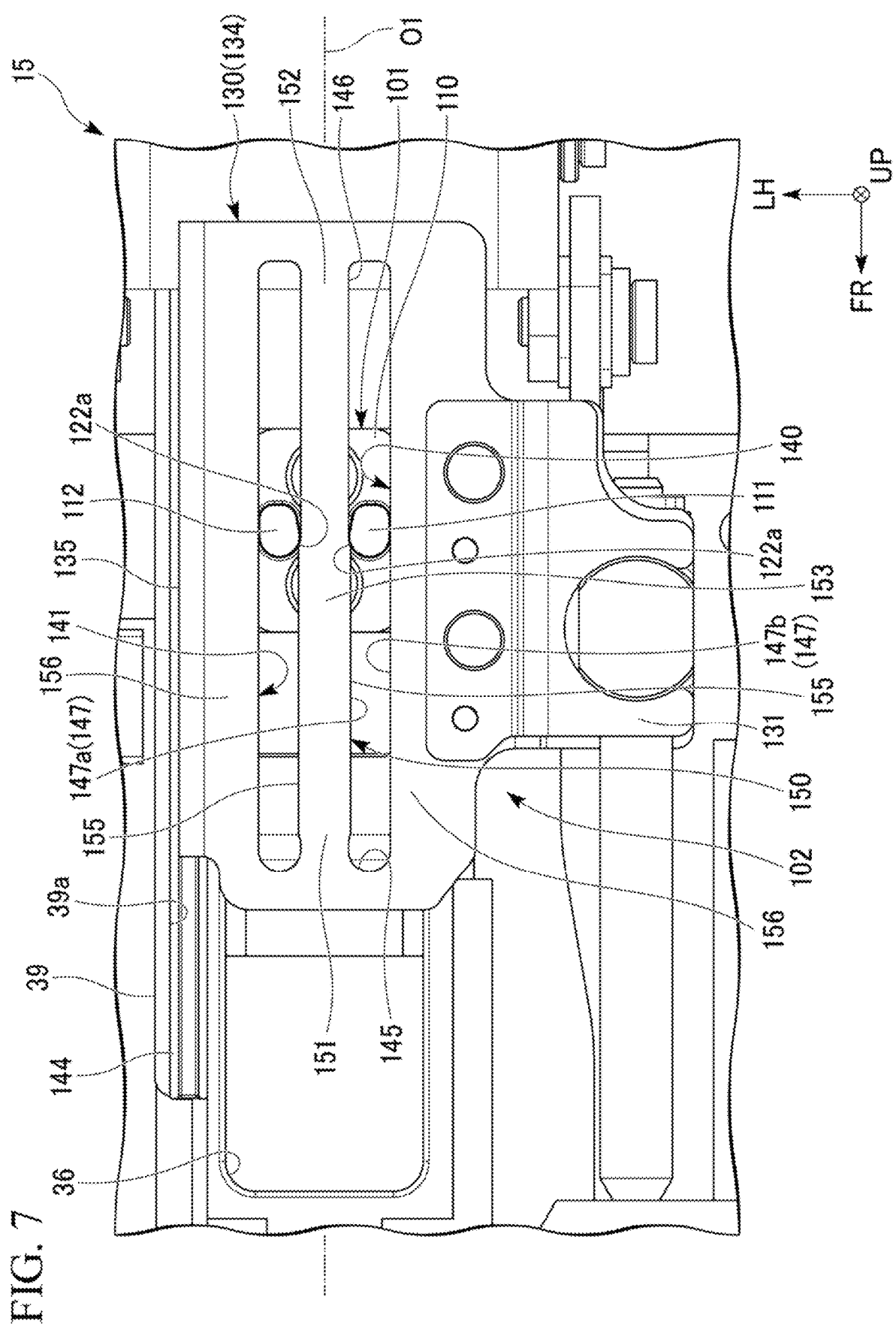
FIG. 7 is a view for describing an operation at the time of a secondary collision.

FIG. 7 is a view for describing the operation at the secondary collision.

As represented in FIGS. 6 and 7, at the secondary collision, a forward collision load acts on the pipe 12 via the steering wheel 2. In this case, the collision load acts on the EA plate 102 via the EA block 101. However, in the present embodiment, the female screw portion 83a of the telescopic movable portion 83 and the male screw portion 82a of the telescopic coupling portion 82 engage (are in contact) with each other in the front-rear direction. Accordingly, the forward movement of the EA plate 102 with respect to the housing 11 is restricted. Therefore, the steering shaft 13, the pipe 12, the hanger bracket 100, and the EA block 101 try to move forward with respect to the EA plate 102 and the housing 11.

In the present embodiment, the distance L1 between the pressing portions 122a of the respective sliding portions 111 and 112 is narrower than a width L2 of the wide portion 153. Therefore, the EA block 101 moves forward with respect to the EA plate 102 while causing the respective sliding portions 111 and 112 to squeeze the extending portion 150. The pressing portion 122a of the respective sliding portions 111 and 112 causes the deformable portion 155 to plastically deform (be crushed) inward in the left-right direction, when sliding on the outer surface (outward facing side surface 147a of the transition portion 147 (side surface facing the first side and side surface facing the second side)) of the wide portion 153 via the inclined surface 146a. In this way, in a process in which the steering shaft 13 moves forward with respect to the EA plate 102 and the housing 11, an impact load applied to a driver at the secondary collision is cushioned by a load generated when the respective sliding portions 111 and 112 squeeze the extending portion 150.

The load generated between the EA block 101 and the EA plate 102 can be adjusted by changing a difference between the distance L1 between the respective sliding portions 111 and 112 and the width L2 of the wide portion 153, or the thickness of the wide portion 153. At the secondary collision, in addition to the load when the extending portion 150 is squeezed by the respective sliding portions 111 and 112, for example, the impact load may be cushioned by the sliding resistance between the outer peripheral surface of the pipe 12 and the inner peripheral surface of the holding cylinder 31. A paint having a high friction coefficient may be applied to the sliding portion between the outer peripheral surface of the pipe 12 and the inner peripheral surface of the holding cylinder 31, or uneven processing may be applied thereto.

In this way, in the present embodiment, the telescopic mechanism 46 is configured as follows. The sliding portions 111 and 112 coupled to the pipe (the other member) 12 are disposed on both sides in the left-right direction with respect to the extending portion 150 coupled to the feed mechanism (one member).

According to this configuration, when the extending portion 150 tries to move or deform to a side separated from one sliding portion due to the load acting between the one sliding portion and the extending portion 150 (deformable portion 155), the movement or the deformation of the extending portion 150 can be restricted by the other sliding portion (restriction portion). In this manner, the extending portion 150 can efficiently plastically deform, and desired impact absorbing performance can be secured. In the present embodiment, in a case of "the movement or the deformation", for example, the movement means that the extending portion 150 is displaced to a side separated from one sliding portion, or the sliding portions 111 and 112 are displaced to a side separated from the extending portion 150 without plastic deformation. For example, the deformation means that the extending portion 150 is bent to a side separated from one sliding portion, or the sliding portions 111 and 112 are bent to a side separated from the extending portion 150 without plastic deformation. The present embodiment may be configured in any way as long as at least one of the above-described movement and deformation can be restricted.

The present embodiment is configured as follows. In the telescopic mechanism 46, the telescopic coupling portion (feed mechanism) 82 is screwed into the telescopic movable portion (feed mechanism) 83.

According to this configuration, at the secondary collision, the male screw portion 82a of the telescopic coupling portion 82 and the female screw portion 83a of the telescopic movable portion 83 come into contact with each other. In this manner, the forward movement of the telescopic movable portion 83 with respect to the telescopic coupling portion 82 is restricted. In this manner, at the secondary collision, it is possible to prevent the EA plate 102 from moving forward together with the telescopic coupling portion 82. Therefore, a load can be effectively generated between the extending portion 150 and the sliding portions 111 and 112. As a result, desired impact absorbing performance can be secured.

In the present embodiment, the telescopic motor unit (actuator) 81 of the telescopic mechanism 46 is fixed to the housing 11 (housing body 22). Accordingly, the telescopic motor unit 81 does not move during the telescopic operation and at the secondary collision. Therefore, it is not necessary to secure a movement space of the telescopic motor unit 81 around the steering device 1, and layout designing can be improved.

In particular, a feed screw mechanism is adopted as the telescopic mechanism 46. Therefore, it is easy to secure an engagement force between the male screw (engaging portion) 82a of the telescopic coupling portion (shaft) 82 and the female screw (engaged portion) 83a of the telescopic movable portion (nut) 83. It is easy to adjust a stroke of the pipe 12 with respect to a rotation amount of the telescopic motor unit 81 during the telescopic operation.

The present embodiment is configured as follows. Both the left and right side portions (deformable portion 155) of the extending portion 150 are caused to plastically deform by the respective sliding portions 111 and 112.

According to this configuration, as the EA block 101 moves forward with respect to the EA plate 102, the extending portions 150 plastically deform and is squeezed by the respective sliding portions 111 and 112. In this manner, it is possible to improve the impact absorbing performance while the movement deformation of the extending portion 150 to a side separated from one sliding portion is restricted.

The present embodiment is configured so that the respective sliding portions 111 and 112 are formed line-symmetrically in a plan view.

According to this configuration, the load acting between the respective sliding portions 111 and 112 and the extending portion 150 is likely to be uniform.

In the present embodiment, the EA plate 102 is configured to include guides (first guide and second guide) 156 on a side opposite to the extending portion 150 with respect to the sliding portions 111 and 112.

According to this configuration, the respective sliding portions 111 and 112 can smoothly move forward along the extending portion 150 during the collapse stroke generated due to the secondary collision. When the respective sliding portions 111 and 112 try to move or deform outward in the left-right direction due to the load acting between the extending portion 150 and the respective sliding portions 111 and 112, the movement or the deformation of the respective sliding portions 111 and 112 can be restricted by the guide 156.

The present embodiment is configured as follows. The EA plate 102 (extending portion 150) is connected to the telescopic mechanism 46 on a first side in the left-right direction and is supported by the housing body 22 via the support piece 135 on a second side in the left-right direction.

According to this configuration, the movement of the EA plate 102 in the left-right direction with respect to the housing 11 can be restricted. In this manner, it is possible to prevent the EA plate 102 itself from being displaced in the left-right direction due to the load generated between the respective sliding portions 111 and 112 and the extending portion 150 at the secondary collision.

Moreover, the present embodiment is configured as follows. In the telescopic mechanism 46, the sliding portions 111 and 112 coupled to the pipe (the other member) 12 are disposed on both sides in the left-right direction with respect to the extending portion 150 coupled to the feed mechanism (one member). In addition, the present embodiment is configured as follows. The pressing portion (first contact portion and second contact portion) 122a which is a contact portion with the extending portion 150 of the respective sliding portions 111 and 112 forms the curved surface projecting toward the extending portion 150 in a plan view.

According to this configuration, when the sliding portions 111 and 112 slide on the extending portion 150 during the collapse stroke generated due to the secondary collision, it is possible to prevent the pressing portion 122a and the extending portion 150 from being caught on each other. In this manner, the sliding portions 111 and 112 can smoothly move on the extending portion 150. In this manner, the impact load can be efficiently cushioned over the entire collapse stroke. Therefore, the impact absorbing performance can be improved.

The present embodiment is configured as follows. In the telescopic mechanism 46, the telescopic coupling portion (feed mechanism) 82 is screwed into the telescopic movable portion (feed mechanism) 83.

According to this configuration, at the secondary collision, the male screw portion 82a of the telescopic coupling portion 82 and the female screw portion 83a of the telescopic movable portion 83 come into contact with each other. In this manner, the forward movement of the telescopic movable portion 83 with respect to the telescopic coupling portion 82 is restricted. In this manner, at the secondary collision, it is possible to prevent the EA plate 102 from moving forward together with the telescopic coupling portion 82. Therefore, a load can be effectively generated between the extending portion 150 and the sliding portions 111 and 112. As a result, desired impact absorbing performance can be secured.

In the present embodiment, the telescopic motor unit (actuator) 81 of the telescopic mechanism 46 is fixed to the housing 11 (housing body 22). Accordingly, the telescopic motor unit 81 does not need to move during the telescopic operation and at the secondary collision. Therefore, it is not necessary to secure a movement space of the telescopic motor unit 81 around the steering device 1, and layout designing can be improved.

In particular, the feed screw mechanism is adopted as the telescopic mechanism 46. Therefore, it is easy to secure an engagement force between the male screw (engaging portion) 82a of the telescopic coupling portion (shaft) 82 and the female screw (engaging portion) 83a of the telescopic movable portion (nut) 83. The feed screw mechanism is adopted as the telescopic mechanism 46. Therefore, it is easy to adjust the stroke of the pipe 12 with respect to the rotation amount of the telescopic motor unit 81 during the telescopic operation.

The present embodiment is configured as follows. The extending portion 150 includes the rear constriction portion (narrow portion) 152 having the width narrower than the distance L1 between the pressing portions 122a of the respective sliding portions 111 and 112, and the wide portion 153 wider than the distance L1 between the pressing portions 122a.

According to this configuration, a portion of the wide portion 153 which bulges outward in the left-right direction with respect to the rear constriction portion 152 functions as the deformable portion 155 which is plastically deformable by the sliding portions 111 and 112 (pressing portions 122a) during the collapse stroke generated due to the secondary collision. In the present embodiment, it is possible to prevent the pressing portion 122a and the extending portion 150 from being caught on each other. Accordingly, it is easy to secure a tightening allowance (overlapping range in a front view) between the sliding portions 111 and 112 and the deformable portion 155. Therefore, the deformable portion 155 can effectively plastically deform, and it is easy to secure desired impact absorbing performance.

The present embodiment is configured as follows. The outer peripheral surfaces of the sliding portions 111 and 112 extend to a side separated from the extending portion 150 as the outer peripheral surface is directed toward both sides in the front-rear direction with respect to the pressing portion 122a.

According to this configuration, it is possible to prevent the portion of the sliding portions 111 and 112 other than the pressing portion 122a from coming into contact with the extending portion 150 during the collapse stroke. In this manner, the contact position of the sliding portions 111 and 112 with the extending portion 150 can be stabilized, and it is easy to secure the desired impact absorbing performance.

In the present embodiment, the EA plate 102 is configured to include guides (first guide and second guide) 156 on a side opposite to the extending portion 150 with respect to the sliding portions 111 and 112.

According to this configuration, the respective sliding portions 111 and 112 can smoothly move forward along the extending portion 150 during the collapse stroke generated due to the secondary collision. In addition, when the sliding portions 111 and 112 try to move or deform outward in the left-right direction due to the load acting between the extending portion 150 and the respective sliding portions 111 and 112, the movement or the deformation of the respective sliding portions 111 and 112 can be restricted by the guide 156. In the present embodiment, in a case of "the movement or the deformation", for example, the movement means that the extending portion 150 is displaced to a side separated from one sliding portion, or the sliding portions 111 and 112 are displaced to a side separated from the extending portion 150 without plastic deformation. For example, the deformation means that the extending portion 150 is bent to a side separated from one sliding portion, or the sliding portions 111 and 112 are bent to a side separated from the extending portion 150 without plastic deformation. The present embodiment may be configured in any way as long as at least one of the above-described movement and deformation can be restricted.

The present embodiment is configured so that the facing surface facing the guide 156 in the sliding portions 111 and 112 has the guide surface 121 extending along the front-rear direction.

According to this configuration, the sliding portions 111 and 112 are smoothly guided along an inward facing end surface of the guide 156 during the collapse stroke generated due to the secondary collision.

MODIFICATION EXAMPLE

Figure 8:
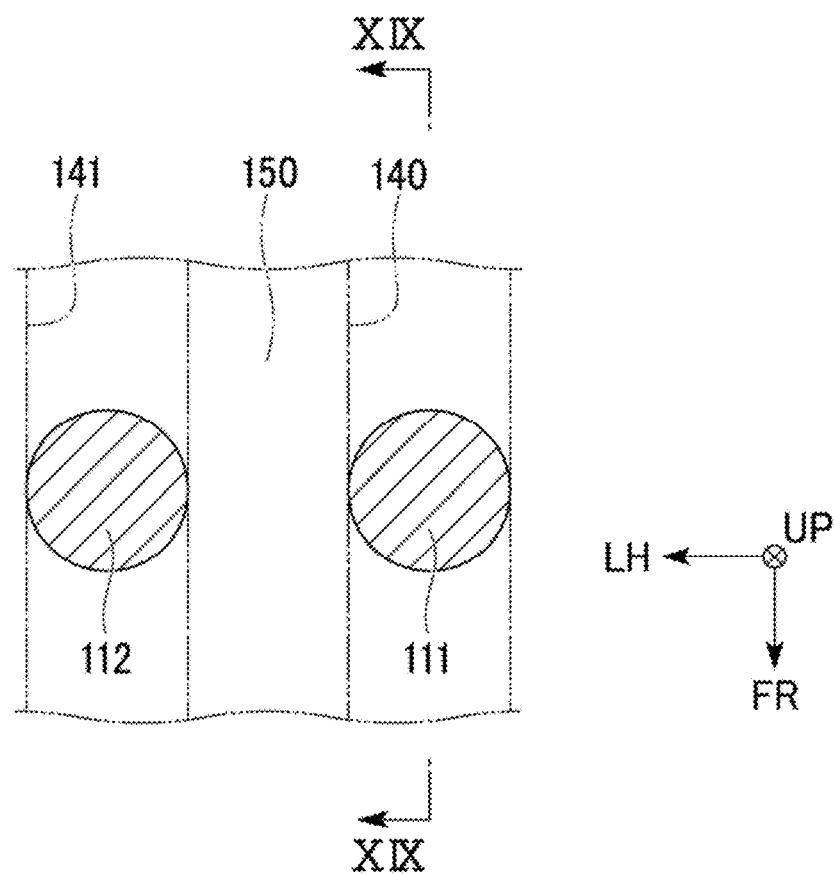
FIG. 8 is a bottom view of an EA block according to a modification example.
Figure 9:
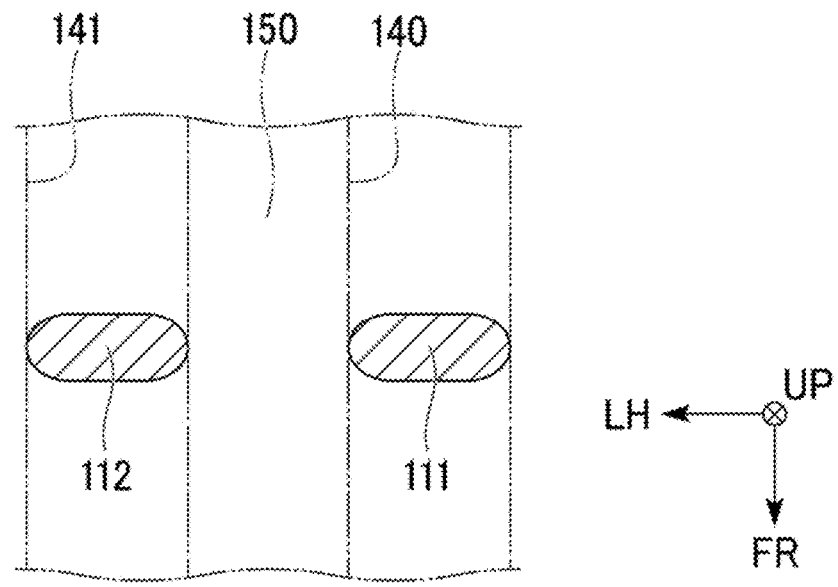
FIG. 9 is a bottom view of an EA block according to a modification example.
Figure 10:
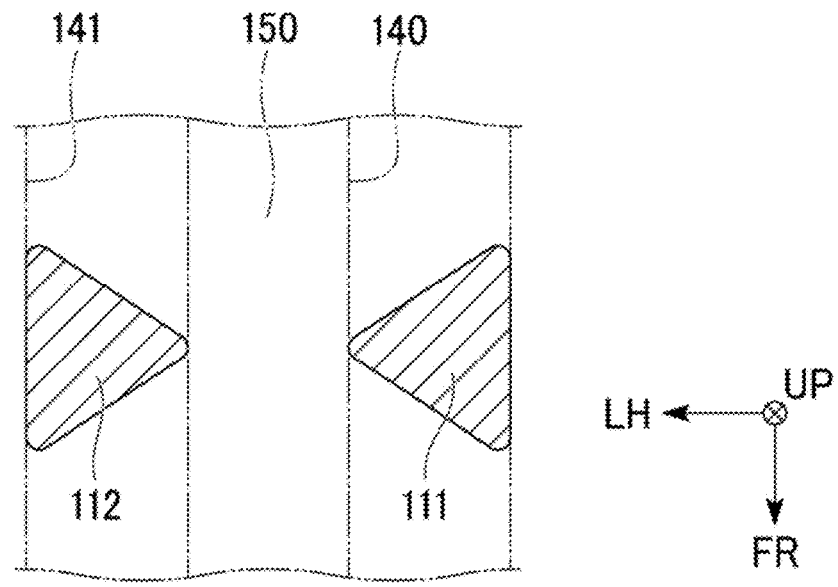
FIG. 10 is a bottom view of an EA block according to a modification example.

In the above-described embodiment, a case has been described where the respective sliding portions 111 and 112 are formed in an oval shape. However, the present disclosure is not limited to this configuration. For example, the sliding portions 111 and 112 may have a perfect circular shape in a plan view as represented in FIG. 8, or may have an oval shape in which the left-right direction is set as the longitudinal direction as represented in FIG. 9. As represented in FIG. 10, the sliding portions 111 and 112 may have a triangular shape in which one apex faces inward in the left-right direction or may have a polygonal shape (rectangular shape) other than the triangular shape. When the sliding portions 111 and 112 are formed in the polygonal shape, a position in the front-rear direction of the apex facing inward in the left-right direction can be appropriately changed.

Figure 11:
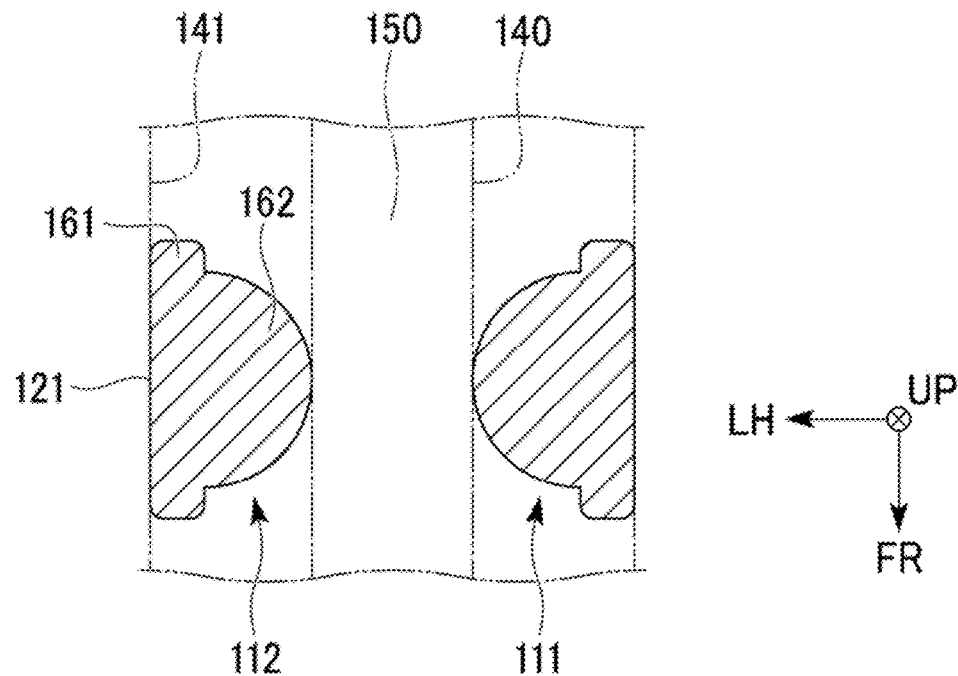
FIG. 11 is a bottom view of an EA block according to a modification example.

Furthermore, as represented in FIG. 11, the sliding portions 111 and 112 may be configured to have a rectangular portion 161 having a rectangular shape in a plan view, and a bulging portion 162 bulging inward in the left-right direction from the rectangular portion 161. A surface of the rectangular portion 161 which faces outward in the left-right direction forms a guide surface 121 linearly extending in the front-rear direction. On the other hand, the bulging portion 162 is formed in a semicircular shape projecting inward in the left-right direction. The bulging portion 162 may have a triangular shape.

In the above-described embodiment, a configuration has been described in which the guide surface 121 is formed into the flat surface linearly extending in the front-rear direction.

Figure 12:
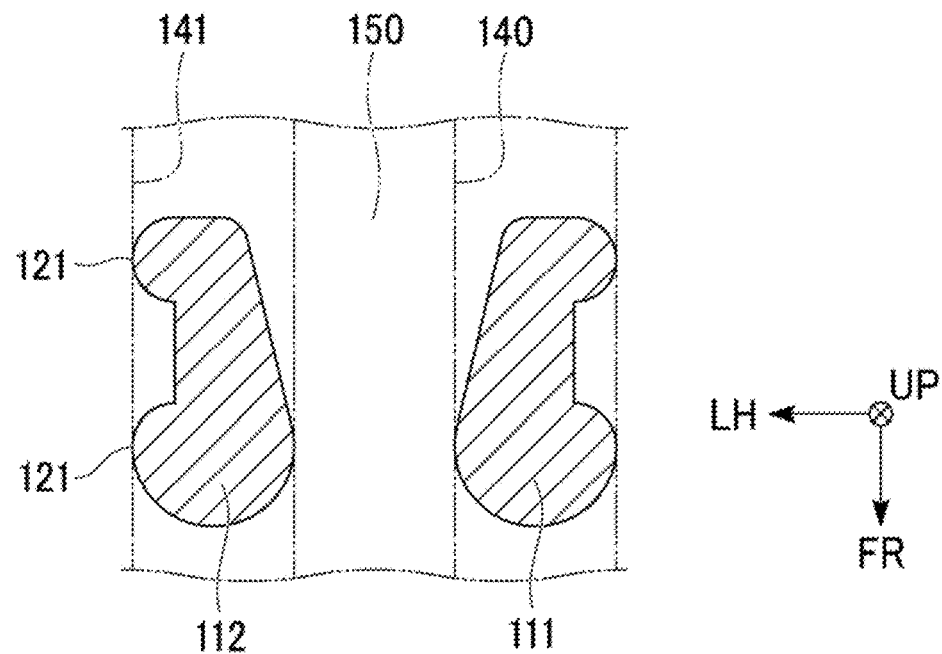
FIG. 12 is a bottom view of an EA block according to a modification example.

However, the present disclosure is not limited to this configuration. As represented in FIG. 12, the guide surfaces 121 may be formed at an interval in the front-rear direction. In the represented example, the guide surface 121 is formed in a semicircular shape bulging outward in the left-right direction.

Figure 13:
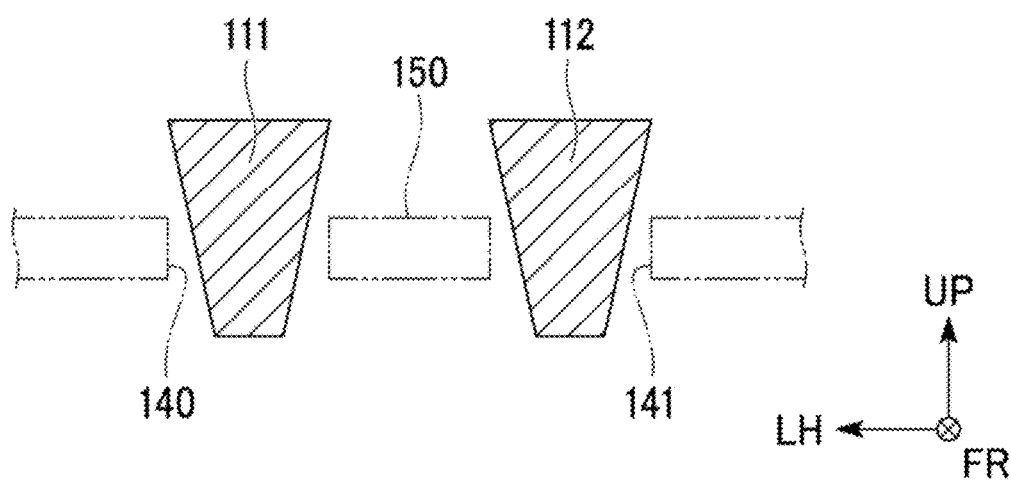
FIG. 13 is a rear view of an EA block according to a modification example.

In the above-described embodiment, a configuration has been described in which the respective sliding portions 111 and 112 have cross-sectional areas perpendicular to the up-down direction which are uniform over the entire region in the up-down direction. However, the present disclosure is not limited to this configuration. For example, as represented in FIG. 13, the cross-sectional areas of the respective sliding portions 111 and 112 may be formed to be different in the up-down direction. In the represented example, the respective sliding portions 111 and 112 are formed in a truncated cone shape whose cross-sectional area decreases downward.

According to this configuration, in the respective sliding portions 111 and 112, a contact position with the extending portion 150 is changed in the up-down direction so that the tightening allowance between the respective sliding portions 111 and 112 and the extending portion 150 can be adjusted. The contact position may be adjusted by changing the thickness of the hanger bracket 100 or the fixing plate 110, or by separately using a spacer. In the example represented in FIG. 13, a configuration has been described in which the cross-sectional areas of the respective sliding portions 111 and 112 gradually decrease downward. However, the present disclosure is not limited to this configuration. The cross-sectional areas of central portions of the respective sliding portions 111 and 112 in the up-down direction may be smaller than the cross-sectional areas of both upper and lower end portions.

Figure 14:
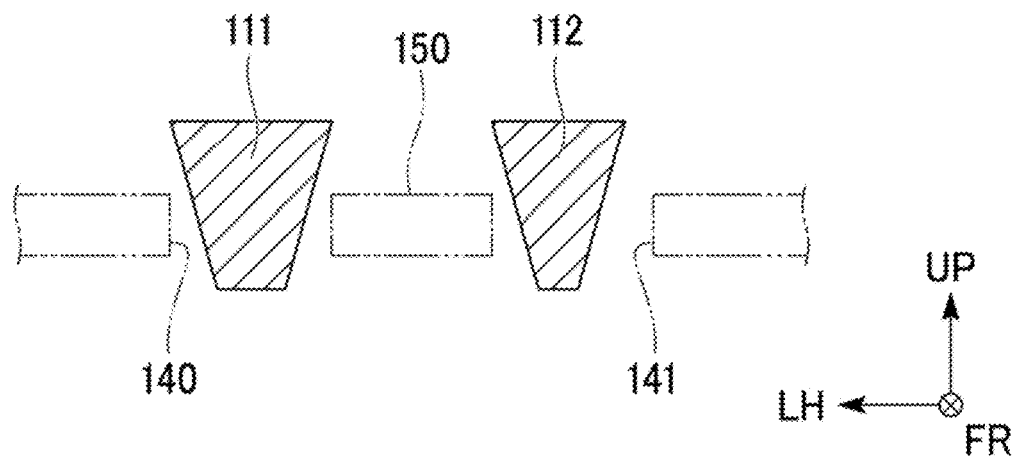
FIG. 14 is a rear view of an EA block according to a modification example.

In the above-described embodiment, a configuration has been described in which the respective sliding portions 111 and 112 are formed line-symmetrically. However, the present disclosure is not limited to this configuration. For example, as represented in FIG. 14, the sliding portions 111 and 112 may be formed asymmetrically in the left-right direction.

Figure 15:
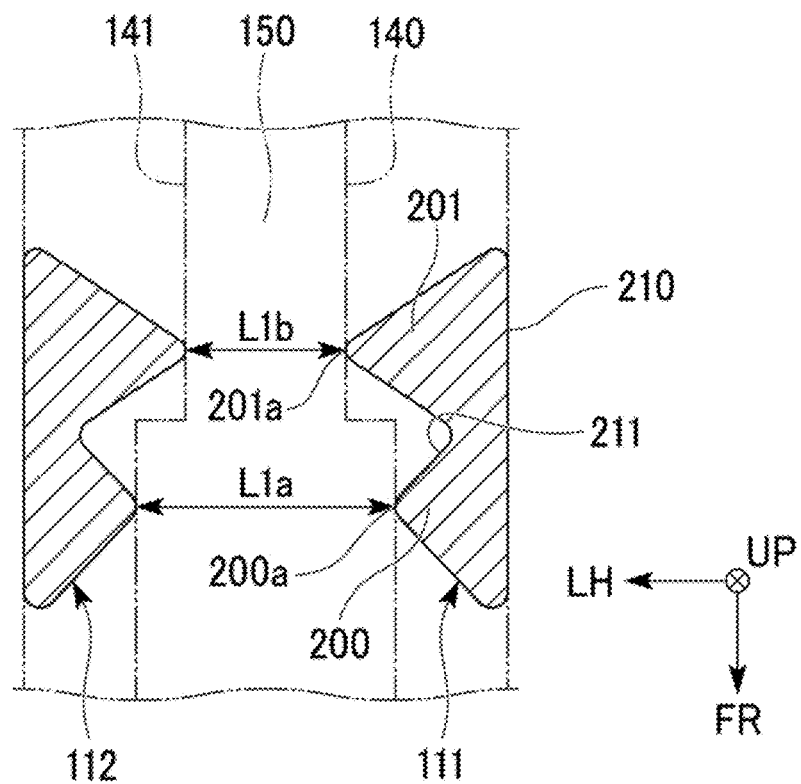
FIG. 15 is a bottom view of an EA block according to a modification example.

In the above-described embodiment, a configuration has been described in which the respective sliding portions 111 and 112 have each one pressing portion 122a. However, the present disclosure is not limited to this configuration. For example, as represented in FIG. 15, the respective sliding portions 111 and 112 may have a plurality of pressing portions 200 and 201. The respective pressing portions 200 and 201 are formed in a triangular shape in which one apex faces inward in the left-right direction. Top surfaces 200a and 201a of the respective pressing portions 200 and 201 are formed on curved surfaces projecting inward in the left-right direction in a plan view.

The respective pressing portions 200 and 201 are connected in the front-rear direction. Surfaces (hereinafter, referred to as guide surfaces 210) of the respective pressing portions 200 and 201 which face outward in the left-right direction are flush with each other. On the other hand, the top surface 200a of the front pressing portion 200 is located outside the top surface 201a of the rear pressing portion 201 in the left-right direction. Therefore, in the respective sliding portions 111 and 112, when a distance in the left-right direction between the top surfaces 200a of the respective front pressing portions 200 is defined as L1a and a distance between the top surfaces 201a of the respective rear pressing portions 201 is defined as L1b, the distances are set to L1a>L1b. A portion located between the respective pressing portions 200 and 201 on a surface facing inward in the left-right direction in the first sliding portion 111 has a relief portion 211 formed by slopes of the respective pressing portions 200 and 201. The relief portion 211 is recessed outward in the left-right direction with respect to the top surfaces 200a and 201a.

Figure 16:
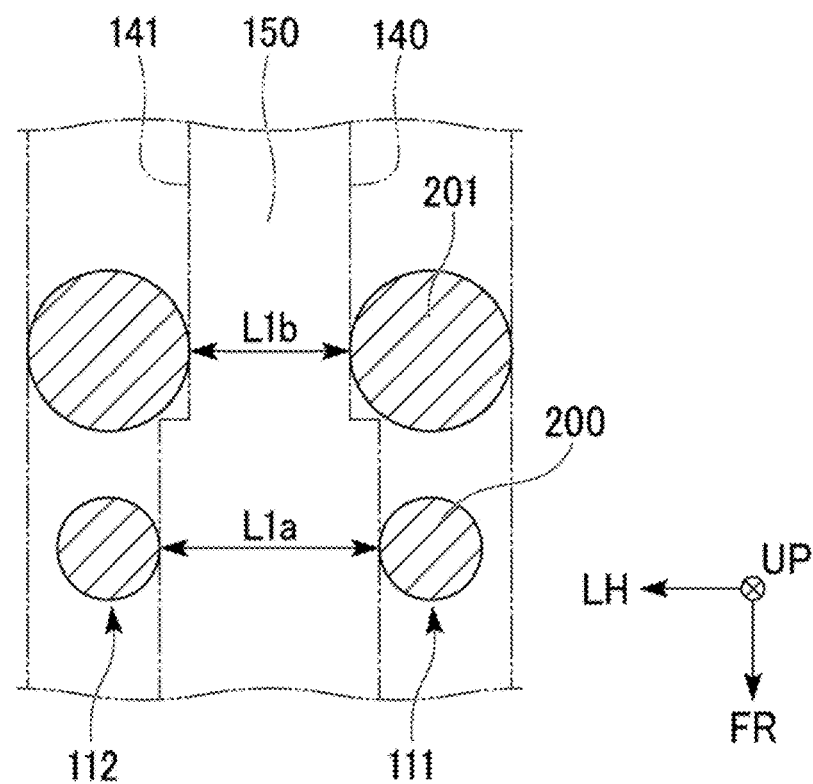
FIG. 16 is a bottom view of an EA block according to a modification example.

As in the sliding portions 111 and 112 represented in FIG. 16, the respective pressing portions 200 and 201 may be separated from each other in the front-rear direction. In the represented example, the respective pressing portions 200 and 201 are formed in a perfect circle shape having different outer diameters in a plan view.

Second Embodiment

Figure 17:
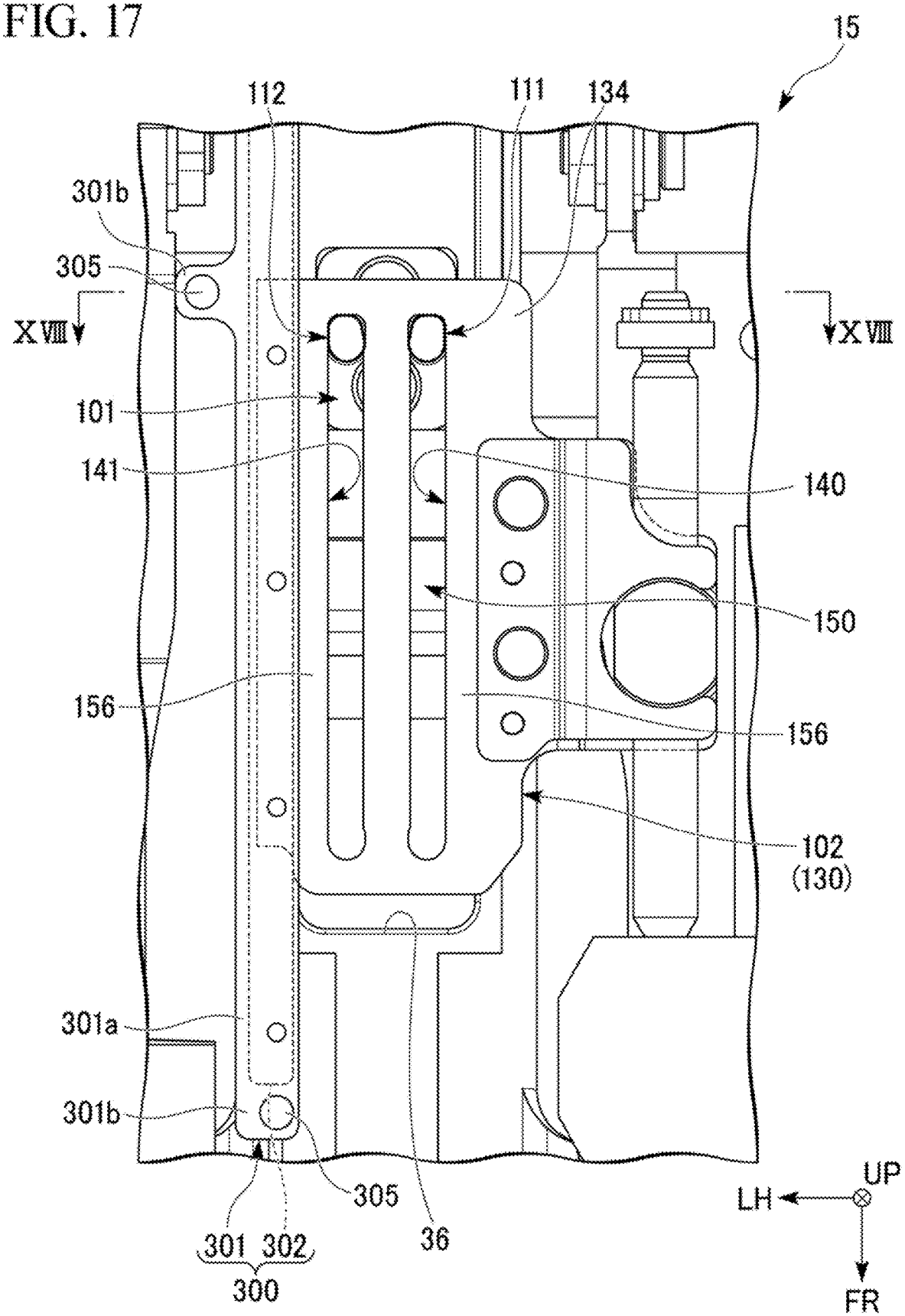
FIG. 17 is an enlarged bottom view of a steering device according to a second embodiment.
Figure 18:
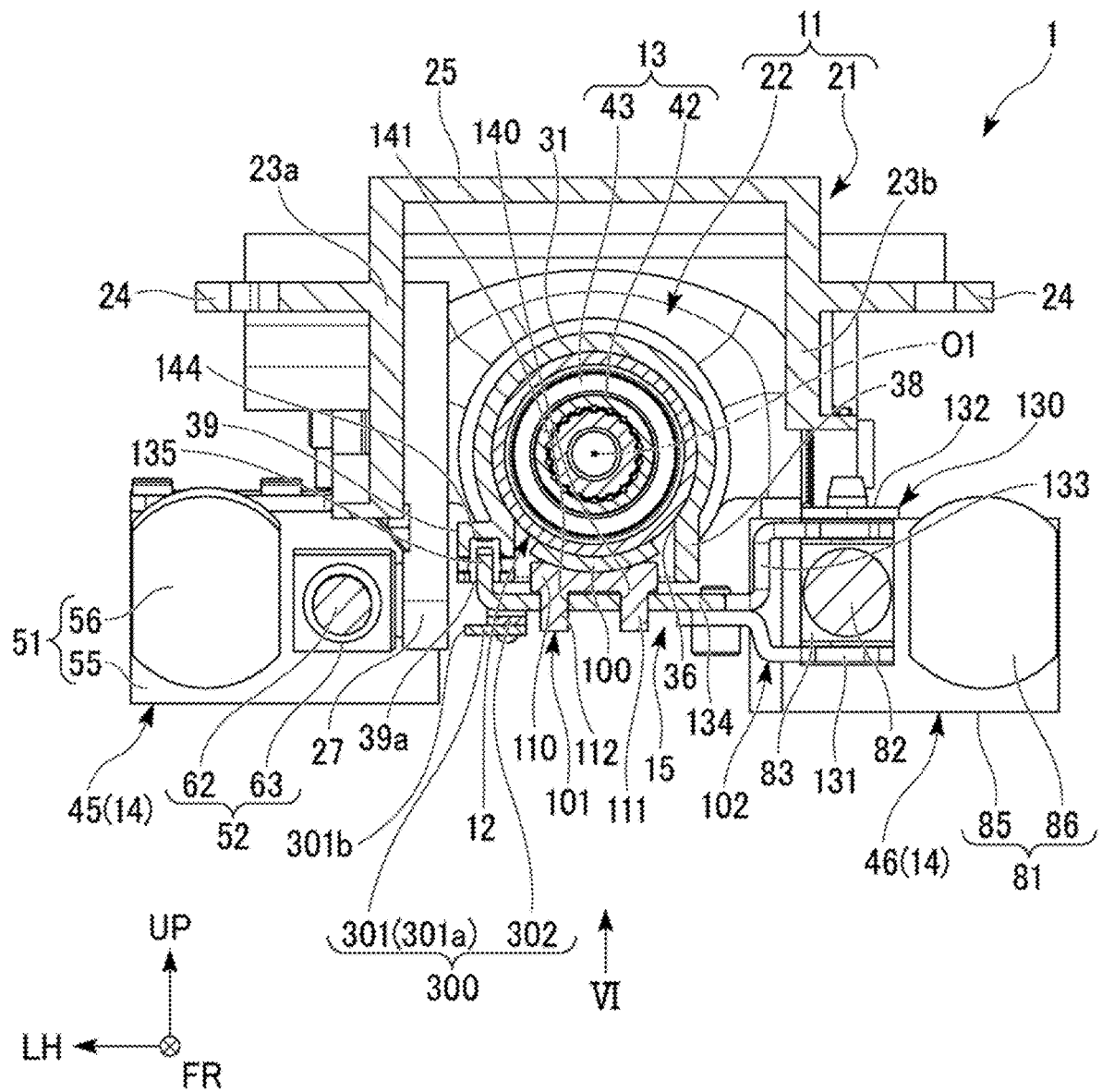
FIG. 18 is a view representing the steering device according to the second embodiment and is a sectional view corresponding to FIG. 3.

FIG. 17 is an enlarged bottom view of the steering device 1 according to a second embodiment. FIG. 18 is a view representing the steering device 1 according to the second embodiment and is a sectional view corresponding to FIG. 3.

In the steering device 1 represented in FIGS. 17 and 18, the load absorbing mechanism 15 includes an EA cover (restriction member) 300. The EA cover 300 restricts downward movement of the EA plate 102 with respect to the housing body 22 (sliding portions 111 and 112). The EA cover 300 is disposed on a side opposite to the telescopic mechanism 46 side with respect to the axis O1 in a lower portion of the housing body 22. The EA cover 300 covers a portion of the EA plate 102 from below.

The EA cover 300 includes a restriction plate 301 and a sliding plate 302.

The restriction plate 301 is formed of a material (for example, a metal material) having higher rigidity than that of the sliding plate 302. The restriction plate 301 extends in the front-rear direction while the up-down direction is used as the thickness direction. The restriction plate 301 includes an overlapping piece 301a and an attachment piece 301b.

The overlapping piece 301a extends in the front-rear direction below the second protruding wall 39. The overlapping piece 301a overlaps a left end portion (end portion on a side opposite to the telescopic mechanism 46) of the operating piece 134 from below. In the represented example, the overlapping piece 301a overlaps the guide 156 on the left side with respect to the extending portion 150. The length of the overlapping piece 301a in the front-rear direction is longer than that of the EA plate 102 (operating piece 134).

The attachment piece 301b projects outward or forward in the left-right direction from the overlapping piece 301a. The attachment piece 301b is fixed to the housing body 22 in a portion deviating from an operation locus of the EA plate 102 during the telescopic operation. The attachment piece 301b is fixed to the housing body 22 by a bolt 305, for example.

The sliding plate 302 overlaps an upper surface of the overlapping piece 301a. The sliding plate 302 is formed of a material (for example, a resin material) in which frictional resistance generated with the operating piece 134 is smaller than frictional resistance acting between the operating piece 134 and the restriction plate 301. The sliding plate 302 is fixed to the overlapping piece 301a. As a method of fixing the sliding plate 302, a pin may be press-fitted into the overlapping piece 301a. A pin having a hook claw may be locked and fixed to the overlapping piece 301a or may be fixed by adhesion.

As represented in FIG. 18, the sliding plate 302 is located between the overlapping piece 301a and the operating piece 134. An upper surface of the sliding plate 302 is close to or in contact with a lower surface of the operating piece 134. The EA cover 300 may be configured not to include the sliding plate 302.

In the steering device 1 of the present embodiment, when the pipe 12 moves in the front-rear direction together with the inner shaft 42 during the telescopic operation, the EA plate 102 moves in the front-rear direction with respect to the EA cover 300. The sliding plate 302 may be in contact with the operating piece 134. In this case, a lower surface of the operating piece 134 slides on the sliding plate 302 during the telescopic operation.

According to this configuration, at the secondary collision, when the load acting between the sliding portions 111 and 112 and the extending portion 150 increases, the EA plate 102 is pressed downward by the respective sliding portions 111 and 112. Then, in the EA plate 102, the first sliding portion 111 tries to be separated from the first long hole 140, and the second sliding portion 112 tries to be separated from the second long hole 141. In this case, the operating piece 134 comes into contact with the EA cover 300 via the sliding plate 302. In this manner, the downward movement of the EA plate 102 with respect to the housing body 22 (sliding portions 111 and 112) is restricted. As a result, the sliding portions 111 and 112 can be prevented from being separated from the EA plate 102, and absorbed energy absorbed by the load absorbing mechanism 15 can be stabilized over an entire region of the collapse stroke.

In the steering device 1 of the present embodiment, the resin sliding plate 302 is disposed between the metal restriction plate 301 and the operating piece 134. In this manner, abnormal noise or wear occurring due to contact between the metal materials during telescopic operation can be prevented.

Hitherto, the preferred embodiments according to the present disclosure have been described. However, the present disclosure is not limited to the embodiments. Additions, omissions, substitutions, and other modifications of the configurations can be made within the scope not departing from the concept of the present disclosure. The present disclosure is not limited by the above-described configurations and is limited only by the appended claims.

For example, in the above-described embodiment, a configuration has been described in which the axis O1 intersects the front-rear direction. However, the present disclosure is not limited to the configuration. The axis O1 may coincide with the front-rear direction of the vehicle.

In the above-described embodiment, a case has been described where the telescopic mechanism 46 is the feed screw mechanism. However, the present disclosure is not limited to the configuration. For example, the telescopic mechanism 46 may adopt a gear.

In the above-described embodiment, a configuration has been described in which the extending portion 150 is plastically deformed by the two sliding portions 111 and 112. However, the present disclosure is not limited to this configuration. For example, the sliding portion may be disposed on the first side of the left-right direction with respect to the extending portion 150, and a restriction portion that restricts the movement or the deformation of the extending portion 150 may be disposed on the second side in the left-right direction with respect to the extending portion 150. That is, the restriction portion may be configured to be separated from the extending portion 150 as long as the extending portion 150 does not move or deform. In this case, the extending portion 150 may have the deformable portion 155 formed only on a side surface facing the first side in the left-right direction.

In the above-described embodiment, a case has been described where the portion located between the long holes 140 and 141 serves the extending portion 150 and the portion located outside the long holes 140 and 141 in the left-right direction serves as the guide 156. However, the present disclosure is not limited to this configuration. The EA plate 102 may be configured without the long holes 140 and 141 or the guide 156 as long as the EA plate 102 has at least the extending portion 150.

In the above-described embodiment, a configuration has been described in which the EA plate 102 bridges the telescopic mechanism 46 (telescopic movable portion 83) and the housing body 22 (protruding wall 39). However, the present disclosure is not limited to this configuration. The EA plate 102 may be cantilevered and supported by the telescopic mechanism 46.

In the above-described embodiment, a configuration has been described in which the extending portion 150 is disposed in one row. However, the present disclosure is not limited to this configuration. For example, a plurality of the extending portions 150 may be provided in the left-right direction or in the up-down direction. The sliding portion and the restriction portion can be provided depending on the number of the extending portions 150.

In the above-described embodiment, a case has been described where the EA block 101 (sliding portions 111 and 112) is provided on the pipe 12 side, and the EA plate 102 (extending portion 150) is provided on the housing body 22 side. However, the present disclosure is not limited to this configuration. For example, the EA plate 102 may be provided on the pipe 12 side, and the EA block 101 may be provided on the housing body 22 side.

Figure 19:
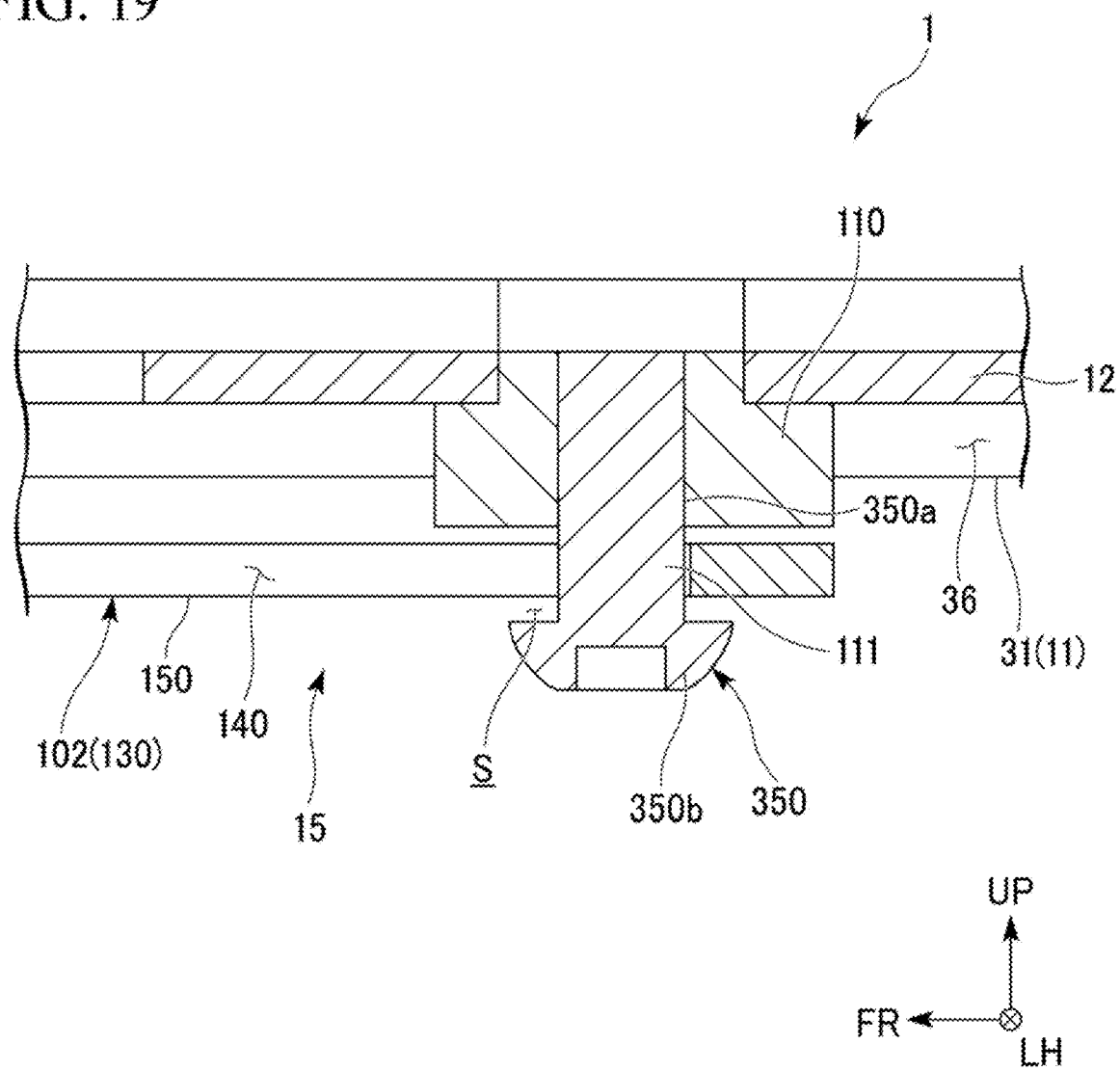
FIG. 19 is a view representing a steering device according to a modification example and is a sectional view corresponding to line XIX-XIX line in FIG. 8.

In the above-described embodiment, a configuration has been described in which the sliding portions 111 and 112 are integrally formed in the fixing plate 110. However, the present disclosure is not limited to this configuration. For example, the sliding portion may be formed in a bolt shape and may be fastened to the fixing plate 110 from the opposite side (lower side) across the EA plate 102 with respect to the fixing plate 110. As represented in FIG. 19, the bolt 350 includes a shaft portion 350a and a head portion 350b. The shaft portion 350a is fixed to the fixing plate 110 through the first long hole 140 (or the second long hole 141). In the shaft portion 350a, a portion located inside the first long hole 140 (or the second long hole 141) functions as the first sliding portion 111 (or the second sliding portion 112) that slides on the extending portion 150. A cross-sectional shape of the portion of the shaft portion 350a which slides on the extending portion 150 can be appropriately changed.

The head portion 350b is enlarged with respect to the shaft portion 350a. In the head portion 350b, a portion of the outer peripheral portion overlaps the EA plate 102 (extending portion 150 or guide 156) from below. The head portion 350b functions as a restriction member that restricts the movement of the EA plate 102 (extending portion 150) in the up-down direction with respect to the sliding portions 111 and 112. In the example in FIG. 19, a gap S is provided between the head portion 350b and the EA plate 102. Therefore, it is possible to prevent a deformation mark (burr) generated by the shaft portion 350a squeezing the extending portion 150 from coming into contact with the head portion 350b. In this manner, it is possible to prevent the collapse stroke from being hindered by the deformation mark.

The restriction member may have a configuration in which the movement of the extending portion 150 in the up-down direction with respect to the sliding portions 111 and 112 is restricted. That is, the restriction member may be configured so that the movement of the extending portion 150 in the up-down direction is indirectly restricted by the EA cover 300 in contact with a portion other than the extending portion 150 as in the second embodiment. The restriction member may be configured so that the movement of the extending portion 150 in the up-down direction is directly restricted by directly coming into contact with the extending portion 150 as in the head portion 350*b* according to the modification example.

The restriction member may be provided in the housing body 22 or may be provided in the pipe 12.

In the above-described embodiment, a configuration has been described in which only the EA plate 102 plastically deforms. However, a configuration may be adopted so that at least one of the EA plate 102 and the EA block 101 plastically deforms in a process in which the sliding portions 111 and 112 slide on the extending portion 150.

Alternatively, the components in the above-described embodiment can be appropriately replaced with well-known components within the scope not departing from the concept of the present disclosure, and the above-described modification examples may be appropriately combined with each other.

REFERENCE SIGNS LIST

- 1: Steering device
- 2: Steering wheel
- 11: Housing
- 12: Pipe (other member, one member)
- 13: Steering shaft
- 15: Load absorbing mechanism
- 46: Telescopic mechanism
- 81: Telescopic motor unit (actuator)
- 82: Telescopic coupling portion (feed mechanism, shaft)
- 83: Telescopic movable portion (one member, other member, feed mechanism, nut)
- 111: First sliding portion (sliding portion, restriction portion)
- 112: Second sliding portion (restriction portion, sliding portion)
- 121: Guide surface (facing surface)
- 122*a*: Pressing portion (first contact portion, second contact portion)
- 150: Extending portion
- 156: Guide (first guide and second guide)
- 200*a*, 201*a*: Top surface (first contact portion, second contact portion)
- 210: Guide surface (facing surface)
- 300: EA cover (restriction member)
- 350*b*: Head portion (restriction member)

What is claimed is:

1. A steering device comprising:
   a pipe into which a steering shaft is inserted to be rotatable around an axis along a front-rear direction;
   a housing supported by a vehicle body and configured to support the pipe to be movable in the front-rear direction;
   a telescopic mechanism configured to move the pipe with respect to the housing in the front-rear direction; and
   a load absorbing mechanism configured to connect the pipe and the telescopic mechanism to each other,
   wherein the telescopic mechanism includes
   an actuator coupled to the housing, and
   a feed mechanism having an engaging portion coupled to the actuator and an engaged portion coupled to the load absorbing mechanism and engaged with the engaging portion in the front-rear direction and configured to transmit a driving force of the actuator to the pipe via the engaging portion and the engaged portion, and
   the load absorbing mechanism includes
   an extending portion provided in any one member of the pipe and the feed mechanism and extending in the front-rear direction,
   a sliding portion provided on a first side in a left-right direction with respect to the extending portion in the other member of the pipe and the feed mechanism, and configured to plastically deform the extending portion by moving relative to the one member while sliding on a side surface of the extending portion which faces the first side in the left-right direction, when a load acting on the pipe is a predetermined value or greater, and
   a restriction portion provided on a second side in the left-right direction with respect to the extending portion in the other member and configured to be movable in concert with the sliding portion, when the load acting on the pipe is the predetermined value or greater, and to restrict movement or deformation of the extending portion to the second side in the left-right direction.

2. The steering device according to claim 1,
   wherein the restriction portion plastically deforms the extending portion by moving in concert with the sliding portion while sliding on the side surface of the extending portion which faces the second side in the left-right direction.

3. The steering device according to claim 1,
   wherein the sliding portion and the restriction portion are formed line-symmetrically with respect to a symmetric line which extends along the front-rear direction through a center of the extending portion.

4. The steering device according to claim 1,
   wherein the one member is provided with
   a first guide located on a side opposite to the extending portion in the left-right direction with respect to the sliding portion, and configured to guide movement of the sliding portion in the front-rear direction, and
   a second guide located on a side opposite to the extending portion in the left-right direction with respect to the restriction portion and configured to guide movement of the restriction portion in the front-rear direction.

5. The steering device according to claim 1,
   wherein the extending portion is connected to the feed mechanism on the first side in the left-right direction and is supported by the housing on the second side in the left-right direction.

6. The steering device according to claim 1,
   wherein the feed mechanism includes
   a shaft coupled to an output shaft of the actuator and having a male screw as the engaging portion, and
   a nut connected to the one member and having a female screw portion that engages with the male screw as the engaged portion.

7. The steering device according to claim 1,
   wherein the load absorbing mechanism includes a restriction member configured to restrict movement of the extending portion in an up-down direction with respect to the sliding portion.

8. A steering device comprising:
   a pipe into which a steering shaft is inserted to be rotatable around an axis along a front-rear direction;
   a housing supported by a vehicle body and configured to support the pipe to be movable in the front-rear direction;

a telescopic mechanism configured to move the pipe with respect to the housing in the front-rear direction; and
a load absorbing mechanism configured to connect the pipe and the telescopic mechanism to each other,
wherein the telescopic mechanism includes
an actuator coupled to the housing, and
a feed mechanism having an engaging portion coupled to the actuator and an engaged portion coupled to the load absorbing mechanism and engaged with the engaging portion in the front-rear direction, and configured to transmit a driving force of the actuator to the pipe via the engaging portion and the engaged portion,
the load absorbing mechanism includes
an extending portion provided in any one member of the pipe and the feed mechanism and extending in the front-rear direction,
a first sliding portion provided on a first side in a left-right direction with respect to the extending portion in the other member of the pipe and the feed mechanism, and configured to move relative to the one member while sliding on a side surface of the extending portion which faces the first side in the left-right direction, when a forward load acting on the pipe is a predetermined value or greater, and
a second sliding portion provided on a second side in the left-right direction with respect to the extending portion in the other member, and configured to move in concert with the first sliding portion while sliding on a side surface of the extending portion which faces the second side in the left-right direction, when the load acting on the pipe is the predetermined value or greater, and
wherein each of a first contact portion of the first sliding portion which comes into contact with the extending portion and a second contact portion of the second sliding portion which comes into contact with the extending portion forms a curved surface projecting toward the extending portion.

9. The steering device according to claim 8,
wherein the extending portion includes
a narrow portion that is narrower than a distance between the first contact portion and the second contact portion in the left-right direction, and
a wide portion that is wider than a distance between the first contact portion and the second contact portion in the left-right direction and configured to be plastically deformable when the first sliding portion and the second sliding portion slide.

10. The steering device according to claim 8,
wherein an outer peripheral surface of the first sliding portion extends to a side separated from the extending portion as the outer peripheral surface is directed toward both sides in the front-rear direction with respect to the first contact portion, and
an outer peripheral surface of the second sliding portion extends to a side separated from the extending portion as the outer peripheral surface is directed toward both sides in the front-rear direction with respect to the second contact portion.

11. The steering device according to claim 8,
wherein the one member is provided with
a first guide located on a side opposite to the extending portion in the left-right direction with respect to the first sliding portion, and configured to guide movement of the first sliding portion in the front-rear direction, and
a second guide located on a side opposite to the extending portion in the left-right direction with respect to the second sliding portion, and configured to guide movement of the second sliding portion in the front-rear direction.

12. The steering device according to claim 11,
wherein a facing surface facing the first guide in the first sliding portion is formed into a flat surface along the front-rear direction, and
a facing surface facing the second guide in the second sliding portion is formed into a flat surface along the front-rear direction.

13. The steering device according to claim 8,
wherein the feed mechanism includes
a shaft coupled to an output shaft of the actuator and having a male screw as the engaging portion, and
a nut connected to the one member and having a female screw portion that engages with the male screw as the engaged portion.

14. The steering device according to claim 8,
wherein the load absorbing mechanism includes a restriction member that restricts movement of the extending portion in an up-down direction with respect to the first sliding portion and the second sliding portion.

* * * * *